United States Patent
Varanasi et al.

(10) Patent No.: US 7,908,594 B2
(45) Date of Patent: Mar. 15, 2011

(54) EXTERNAL PROGRAMMATIC INTERFACE FOR IOS CLI COMPLIANT ROUTERS

(75) Inventors: Sankara Sastry Varanasi, Sunnyvale, CA (US); Jung Tjong, Sunnyvale, CA (US); Anil Bansal, Fremont, CA (US); Prakash Bettadapur, San Jose, CA (US); Janakiraman Mohanaraman, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 1010 days.

(21) Appl. No.: 11/192,951

(22) Filed: Jul. 29, 2005

(65) Prior Publication Data
US 2007/0169008 A1    Jul. 19, 2007

(51) Int. Cl.
G06F 9/45    (2006.01)
G06F 7/00    (2006.01)

(52) U.S. Cl. .................................. 717/136; 707/760
(58) Field of Classification Search .............. None
See application file for complete search history.

(56) References Cited

U.S. PATENT DOCUMENTS

| | | | |
|---|---|---|---|
| 5,778,223 A | 7/1998 | Velissaropoulos et al. |
| 6,278,455 B1 | 8/2001 | Baker |
| 6,457,173 B1 | 9/2002 | Gupta et al. |
| 6,553,366 B1 | 4/2003 | Miller et al. |
| 6,675,370 B1 | 1/2004 | Sundaresan |
| 6,697,967 B1 | 2/2004 | Robertson |
| 6,724,409 B1 | 4/2004 | Maddocks |
| 6,738,781 B1 | 5/2004 | Mustoe |
| 6,744,433 B1 | 6/2004 | Bastos et al. |
| 6,907,572 B2 | 6/2005 | Little et al. |
| 6,954,790 B2 * | 10/2005 | Forslow .................. 709/227 |
| 6,959,329 B2 | 10/2005 | Thakor |
| 6,959,332 B1 * | 10/2005 | Zavalkovsky et al. ...... 709/223 |
| 7,054,901 B2 | 5/2006 | Shafer |
| 7,054,924 B1 | 5/2006 | Harvey et al. |
| 7,058,699 B1 | 6/2006 | Chiou et al. |
| 7,072,946 B2 | 7/2006 | Shafer |
| 7,072,985 B1 | 7/2006 | Lev-Ami et al. |
| 7,149,738 B2 | 12/2006 | Kumar et al. |
| 7,200,548 B2 | 4/2007 | Courtney |
| 7,321,929 B2 * | 1/2008 | Rolfe ....................... 709/223 |
| 2002/0198974 A1 * | 12/2002 | Shafer ..................... 709/223 |
| 2003/0033589 A1 | 2/2003 | Reyna |
| 2003/0046370 A1 | 3/2003 | Courtney |
| 2003/0048287 A1 | 3/2003 | Little et al. |

(Continued)

OTHER PUBLICATIONS www.billfernadez.com, "Netcache Command Line Interface," 2 pages total, 1999-2000, Network Appliance, Inc., www.billfernandez.com/bfdz/portfolio/netcache_cli/index.htm.

(Continued)

*Primary Examiner* — Michael J Yigdall
*Assistant Examiner* — Evral Bodden
(74) *Attorney, Agent, or Firm* — Stolowitz Ford Cowger LLP

(57) ABSTRACT

A method of receiving and translating data within an external programmatic interface (EPI) is described. The method calls for receiving input into the EPI. The input is traversed. Where the input is presented in a prescribed format other than CLI, it is translated into a corresponding CLI statement, with reference to a representation of the CLI syntax. Where the input is presented in CLI, it is translated into a corresponding prescribed output format, with reference to a model of the prescribed output format derived from the CLI syntax. The translated input is output.

24 Claims, 14 Drawing Sheets

U.S. PATENT DOCUMENTS

| | | |
|---|---|---|
| 2003/0051008 A1 | 3/2003 | Gorthy et al. |
| 2003/0101240 A1 | 5/2003 | Courtney |
| 2004/0040016 A1 | 2/2004 | Pearce et al. |
| 2004/0078457 A1 | 4/2004 | Tindal |
| 2004/0090439 A1 | 5/2004 | Dillner |
| 2004/0117452 A1 | 6/2004 | Lee et al. |
| 2004/0168124 A1 | 8/2004 | Beisiegel et al. |
| 2004/0205562 A1 | 10/2004 | Rozek |
| 2005/0021502 A1 | 1/2005 | Chen et al. |
| 2005/0091068 A1* | 4/2005 | Ramamoorthy et al. ......... 705/1 |
| 2006/0031427 A1 | 2/2006 | Jain et al. |
| 2006/0080425 A1 | 4/2006 | Wood et al. |
| 2006/0129980 A1 | 6/2006 | Schmidt et al. |
| 2006/0230378 A1 | 10/2006 | Waddington et al. |
| 2006/0242403 A1* | 10/2006 | Joshi et al. .................... 713/150 |

OTHER PUBLICATIONS www.allegrosoft.com, "RomCLI Embedded Command Line Interface (CLI) Toolkits," 3 pages total, Allegro Software Development Corporation, www.allegrosoft.com/rnomcli.html.

Sun Management Center; 3.6.1 User's Guide, (Chapter 20 only); Sun Microsystems; May 2006; 53 Pages.

Using the Command-Line Interface in Cisco IOS and Cisco IOS XE Software; Cisco Systems; Mar. 5, 2009; 14 Pages.

Matuska, Miroslav; IOAConvert: IOS to XML Router Configuration File Converter—Command Reference, CESNET Technical Report No. 30/2003; Oct. 12, 2003; 36 Pages.

Stolowitz Frod Cowger LLP, Related Case Listing; Nov. 11, 2009; 1 Page.

* cited by examiner

Flowchart 1200

Flowchart 1300

EXTERNAL PROGRAMMATIC INTERFACE FOR IOS CLI COMPLIANT ROUTERS

RELATED UNITED STATES PATENT APPLICATIONS

This Application is related to U.S. patent application Ser. No. 11/149,052 by J. Tjong et al., filed on Jun. 8, 2005, entitled "Methods and Systems for Extracting Information from Computer Code," which is incorporated by reference in its entirety.

This Application is related to U.S. patent application Ser. No. 11/149,063 by J. Tjong et al., filed on Jun. 8, 2005, entitled "Methods and Systems for Transforming a Parse Graph into an AND/OR Command Tree," which is incorporated by reference in its entirety.

This Application is related to U.S. patent application Ser. No. 11/178,136 by J. Tjong et al., filed on Jul. 8, 2005, entitled "Method and System of Receiving and Translating CLI Command Data within a Routing System," which is incorporated by reference in its entirety.

This Application is related to U.S. patent application Ser. No. 11/148,694 by J. Tjong et al., filed on Jun. 8, 2005, entitled "Methods and Systems For Transforming an And/Or Command Tree into a Command Data Model," which is incorporated by reference in its entirety.

BACKGROUND

1. Field of the Invention

The present invention relates to routing systems for computer networks, and more particularly to the transmission of instructions to and receipt of data from such routing systems.

2. Related Art

Access and configuration of a routing system involves sending commands and instructions to and receiving information from the router itself. For routers using a version of the internetwork operating system (IOS), access is accomplished through the use of the IOS command line interface (CLI). IOS CLI is a comprehensive interface, which has expanded continuously as technology has improved over the past twenty years. Many companies now strive to support some variation on IOS CLI in their routing systems, and many consumers have invested heavily in IOS CLI support, developing complicated scripts to handle various configuration and access needs. As such, it is desirable for any improvements to router access and control to acknowledge the existing investments of consumers.

IOS CLI is not the most program-friendly of interfaces, however. Twenty years of consistency and backwards-compatibility, when coupled with continual improvements to the hardware and implementation of new features, has created an extensive interface. While a human user of IOS CLI may be able to sort through the complicated input and output scheme to input information and extract important data, it has proven to be a very difficult and cumbersome task to automate.

A system and/or method that allows for an easy, more structured approach to accessing and configuring a router, while still making use of the significant advantages and experience associated with IOS CLI, would be advantageous.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
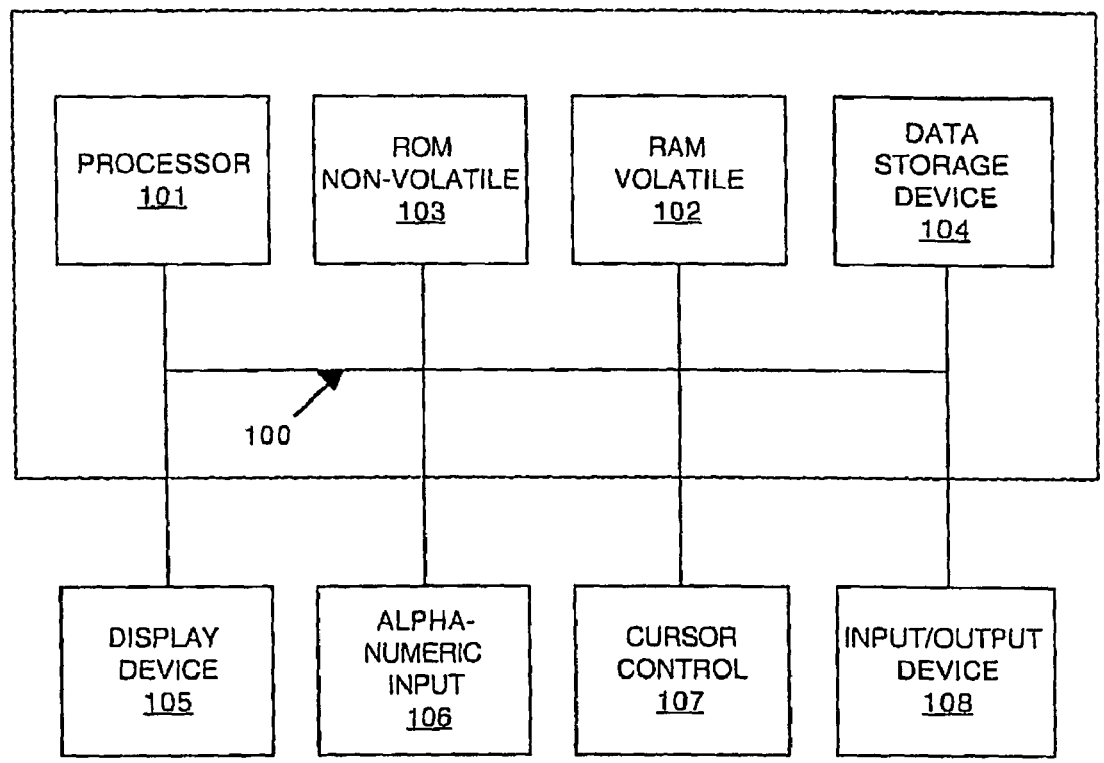
FIG. 1 is a block diagram of an exemplary computer system upon which embodiments of the present invention may be implemented.

A method of receiving and translating data within an external programmatic interface (EPI) is disclosed. Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "testing," "using," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Referring now to FIG. 1, a block diagram of an exemplary computer system 112 is shown. It is appreciated that computer system 112 described herein illustrates an exemplary configuration of an operational platform upon which embodiments of the present invention can be implemented. Nevertheless, other computer systems with differing configurations can also be used in place of computer system 112 within the scope of the present invention. That is, computer system 112 can include elements other than those described in conjunction with FIG. 1.

Computer system 112 includes an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Computer system 112 may also contain an optional display device 105 coupled to bus 100 for displaying information to the computer user. Moreover, computer system 112 also includes a data storage device 104 (e.g., disk drive) for storing information and instructions.

Also included in computer system 112 is an optional alphanumeric input device 106. Device 106 can communicate information and command selections to central processor 101. Computer system 112 also includes an optional cursor control or directing device 107 coupled to bus 100 for communicating user input information and command selections to central processor 101. Computer system 112 also includes signal communication interface (input/output device) 108, which is also coupled to bus 100, and can be a serial port. Communication interface 108 may also include wireless communication mechanisms. Using communication interface 108, computer system 112 can be communicatively coupled to other computer systems over a communication network such as the Internet or an intranet (e.g., a local area network).

Overview

Figure 2:
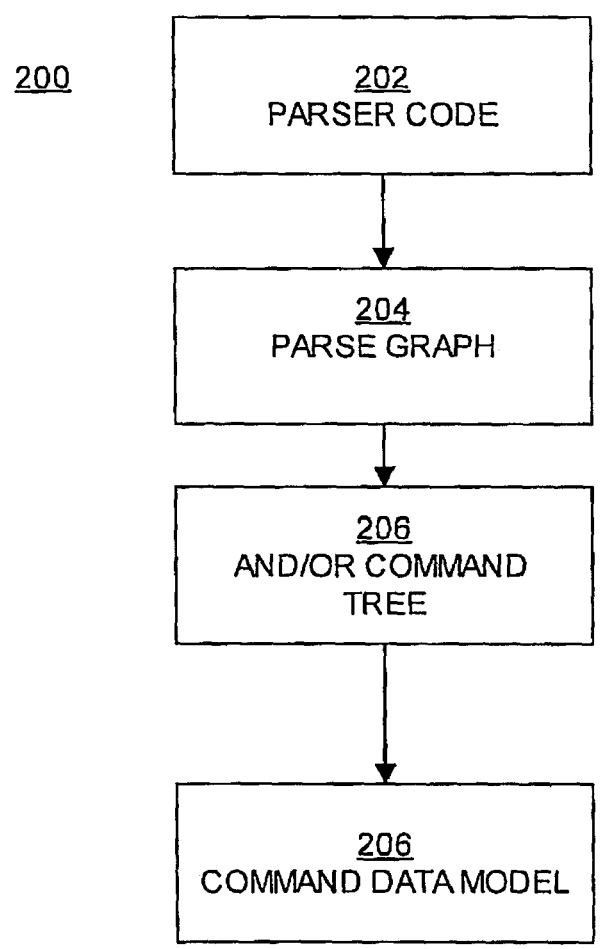
FIG. 2 is a block diagram showing the processing of information in a parse chain analyzer according to one embodiment of the present invention.

FIG. 2 is a block diagram showing the processing of information in a parse chain analyzer (PCA) system 200 according to one embodiment of the present invention. In the present embodiment, PCA system 200 extracts command line interface (CLI) command definitions from parse chain source codes and generates a programmatic interface (PI) object model. PCA system 200 can also be used to generate CLI command definitions and provide the definitions in formats that represent the syntax (structure or grammar) of the CLIs. This information can be used, for example, for CLI syntax documentation, CLI parsing, and CLI development tools.

In one embodiment, parser code 202 defines mechanisms for interpreting and validating the inputs (e.g., commands) that can be received in response to a CLI prompt. In one such embodiment, parser code 202 includes C-language constructs such as C chain files, C files, C macroinstructions (macros), and C header files. The macros define nodes in the parser data structure (the parse chain or parse graph). The macros are defined in C header files that are included in a C chain file. The nodes are interconnected to form the parse graph, which can be constructed of different types of nodes that are represented by different macros.

In the present embodiment, parse graph 204 is generated by extracting information from parser code 202. Specifically, in one embodiment, the information is extracted from the aforementioned C chain files, C files, C macros, and C header files. Additional information is provided in conjunction with FIGS. 3 and 4 below.

In the present embodiment, parse graph 204 of FIG. 2 is transformed into an AND/OR command tree 206. Additional information is provided in conjunction with FIGS. 5 through 7 below.

In the present embodiment, AND/OR command tree 206 of FIG. 2 is transformed into a command data model 208. Additional information is provided in conjunction with FIGS. 8 through 10 below.

Extracting Information from Computer Code

Figure 3:
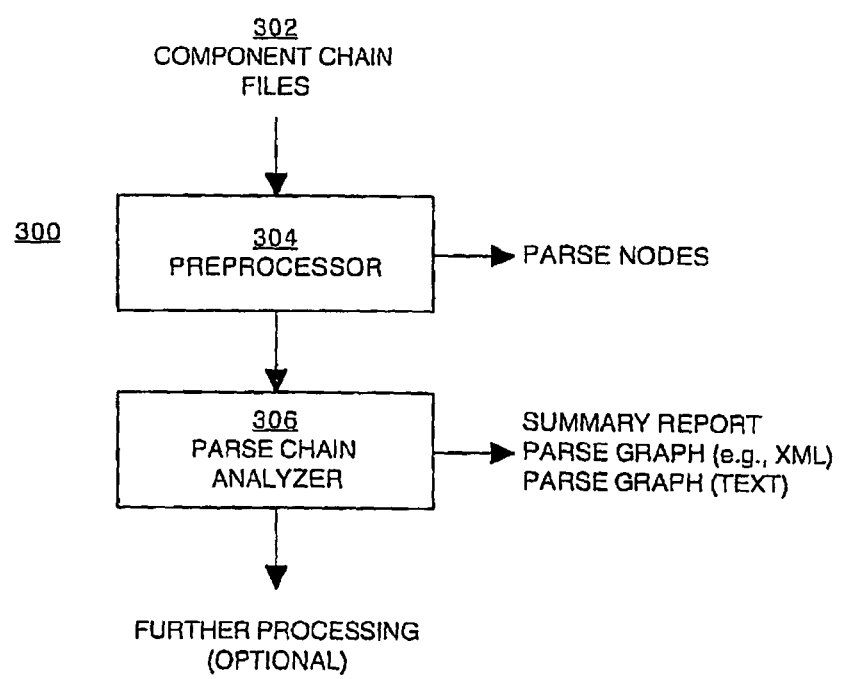
FIG. 3 is a block diagram of a system for extracting and manipulating parse chain information according to one embodiment of the present invention.

FIG. 3 is a block diagram of a system 300 for extracting and manipulating parse chain information according to one embodiment of the present invention. In the present embodiment, system 300 includes preprocessor 304 and parse chain analyzer (PCA) 306.

Component chain files (e.g., parse chain macros) 302 are input to preprocessor 304. In one embodiment, preprocessor 304 extracts parse chain information from the component chain files 302 by redefining each parse chain macro as an Extensible Markup Language (XML) string that encapsulates information in the macro' arguments as well as information in the macro' definitions. That is, a macro can include explicitly named elements as well as elements not explicitly named in the macro but pointed to by the macro, and both of these types of information are captured and written as XML strings.

In one embodiment, the output of preprocessor 304 includes a file that contains the parse node information derived from the component chain files 302 and written in XML format. In one such embodiment, the XML file containing the parse nodes is then fed to PCA 306, which stitches together the unconnected parse nodes into one or more parse graphs (in an XML format). In another such embodiment, this is accomplished using a Java program.

The resulting parse graph (e.g., in an XML format) is a superset of the information extracted from the component chain files 302. For example, the resulting parse graph can include the runtime metadata parse graph used by CLI parsers to validate an input, symbol information, and other information embedded in the parse nodes (e.g., the information pointed to by a macro).

In practice, there may be definition files (e.g., chain files) for multiple components, in which case a parse graph (or graphs) is generated for each component. In that case, the different parse graphs (that is, the XML-formatted parse graphs from PCA 306) can be linked together, in essence creating a single parse graph that consists of the multiple, individual parse graphs.

In one embodiment, the outputs of PCA 306 include a summary report written to a first file, a parse graph in an XML format written to a second file, and an easier to read text-based diagram of the parse graph written to a third file. The outputs of PCA 306 can be optionally processed further as described above (e.g., blocks 206 and 208 of FIG. 2). Furthermore, the outputs of PCA 306 provide information that is externally available (e.g., available outside the computer system to a human user), and thus can be used, for example, in external management systems, for validation of CLI syntax before product delivery, for processing of CLI inputs for discovery, in development and test processes, for transformation to still other formats, and for creating automated documentation from code.

To summarize, embodiments in accordance with the present invention are used for generating XML-tagged lines for each of the parser code macros in the component chain files 302, for linking the XML-tagged lines into a parse graph, for linking different XML-formatted parse graphs, and for generating an external representation of a parse graph (e.g., as an XML document).

The discussion above is illustrated by way of an example. Table 1 below contains an example of a parser definition according to one embodiment of the present invention. The example of Table 1 uses C-code to define a valid command.

TABLE 1

An Example of a Parser Definition

| | |
|---|---|
| 5 EOLS | (cdp_int_duplex_eol, cdp_intfc_command, CDP_INT_LOG_DUP_MISMATCH); |
| KEYWORD | (cdp_int_duplex, cdp_int_duplex_eol, no_alt, "duplex", "Log the duplex-mismatches generated by CDP", PRIV_CONF\|PRIV_SUBIF); |
| 10 KEYWORD | (cdp_int_mismatch, cdp_int_duplex, no_alt, "mismatch", "Log the CDP mismatches", PRIV_CONF\|PRIV_SUBIF); |
| KEYWORD | (cdp_int_log, cdp_int_mismatch, no_alt, "log", "Log messages generated by CDP", PRIV_CONF\|PRIV_SUBIF); |

In one embodiment, the C macros that represent the parse nodes are redefined to generate XML-tagged lines. In such an embodiment, information associated with a parse node is wrapped around a corresponding XML element. Table 2 contains an example of XML-tagged parse nodes for the parser definition of Table 1 according to one embodiment of the present invention. In one embodiment, the example of Table 2 represents the output of preprocessor 304 of FIG. 3.

TABLE 2

An Example of an XML-Tagged Parser Definition

```
<pca_pnode><pca_type>EOLS</pca_type><pca_file>"cfg_int_cdp.h" </pca_file>
<pca_name> cdp_int_duplex_eol </pca_name><pca_acc></pca_acc><pca_alt>
</pca_alt>& lt;pca_func>eols_action</pca_func><pca_args>&
Lcdp_int_duplex_eol</pca_args><pca_arg_func> cdp_intfc_command
</pca_arg_func><pac_arg_subfunc>((((((0 + 1) + 1) + 1) + 1) + 1) + 1)
</pca_arg_subfunc></pca_pnode> ;"" ;
<pca_pnode><pca_type>KEYWORD</pca_type><pca_file>
"cfg_int_cdp.h"</pca_file><pca_name> cdp_int_duplex </pca_name><pca_acc>
cdp_int_duplex_eol </pca_acc><pca_alt> no_alt
</pca_alt><pca_func>keyword_action</pca_func>& lt;pca_args>& amp;#38;
Lcdp_int_duplex </pca_args><pca_arg_str>
     "duplex"</pca_arg_str><pca_arg_help> "Log the duplex-mismatches
generated by CDP" </pca_arg_help><pca_arg_priv> 0xf | 0x08000000
</pca_arg_priv></pca_pnode> ;"" ;
<pca_pnode><pca_type>KEYWORD</pca_type><pca_file>
"cfg_int_cdp.h"</pca_file><pca_name>
cdp_int_mismatch</pca_name><pca_acc>
cdp_int_duplex </pca_acc><pca_alt> no_alt
</pca_alt><pca_func>keyword_action</pca_func>< ;pca_args>& amp;#38;
Lcdp_int_mismatch </pca_args><pca_arg_str>
     "mismatch"</pca_arg_str><pca_arg_help> "Log the CDP mismatches"
</pca_arg_help><pac_arg_priv> 0xf | 0x08000000
</pca_arg_priv></pca_pnode> ;
"" ; <pca_pnode><pca_type>KEYWORD</pca_type><pca_file>
"cfg_int_cdp.h"</pca_file><pca_name> cdp_int_log </pca_name><pca_acc>
cdp_int_mismatch </pca_acc><pca_alt&g t; no_alt
</pca_alt><pca_func>keyword_action</pca_func><pca_args>& amp;#38;
Ldcp_int_log </pca_args><pca_arg_str>
     "log"</pca_arg_str><pca_arg_help> "Log messages generated by CDP"
</pca_arg_help><pca_arg_priv> 0xf | 0x08000000
</pca_arg_priv></pca_pnode> ;
```

In the example of Table 2, "pca_file" refers to the configuration file (or in some cases, the chain file) where the macro is instantiated; "pca_type" refers to the macro name; "pca_name" refers to the name of the parse node; and "pca_acc" and "pca_alt" refer to the accept and alternate transitions for parse nodes.

In one embodiment, the XML-tagged parse nodes are processed and connected together in a parse graph. Table 3 contains an excerpt of an XML document that describes a parse graph based on the XML-tagged parser definitions of Table 2 according to one embodiment of the present invention. In one embodiment, the example of Table 3 represents the output of PCA 306 of FIG. 3.

TABLE 3

An Example of an XML Document Describing a Parse Graph

...
```
        <trans name="alt">
          <pnode name="cdp_int_log"
             type="KEYWORD"
             subsys="cdp"
             chainFile="cdp_chain.c"
             configFile="cfg_int_cdp.h"
             priv="0xf | 0x08000000"
             help=""Log messages generated by CDP""
             str="log""
          >
          <trans name="acc">
            <pnode name="cdp_int_mismatch"
              type="KEYWORD"
              subsys="cdp"
              chainFile="cdp_chain.c"
              configFile="cfg_int_cdp.h"
              priv="0xf | 0x08000000"
              help=""Log the CDP mismatches""
              str="mismatch""
            >
            <trans name="acc">
              <pnode name="cdp_int_duplex"
                type="KEYWORD"
                subsys="cdp"
                chainFile="cdp_chain.c"
                configFile="cfg_int_cdp.h"
                priv="0xf | 0x08000000"
                help=""Log the duplex-mismatches generated by CDP""
                str="mismatch""
              >
              <trans name="acc">
                <pnode name="cdp_int_duplex_eol"
                  type="EOLS"
                  subsys="cdp"
                  chainFile="cdp_chain.c"
                  configFile="cfg_int_cdp.h"
                  priv="0xf | 0x08000000"
                  subfunc="(((((((0 + 1) + 1) + 1) + 1) + 1) + 1) + 1)"
                  func="cdp_intfc_command"
                >
                </pnode>
              </trans>
              </pnode>
            </trans>
            </pnode>
          </trans>
          </pnode>
        </trans>
```
...

Figure 4:
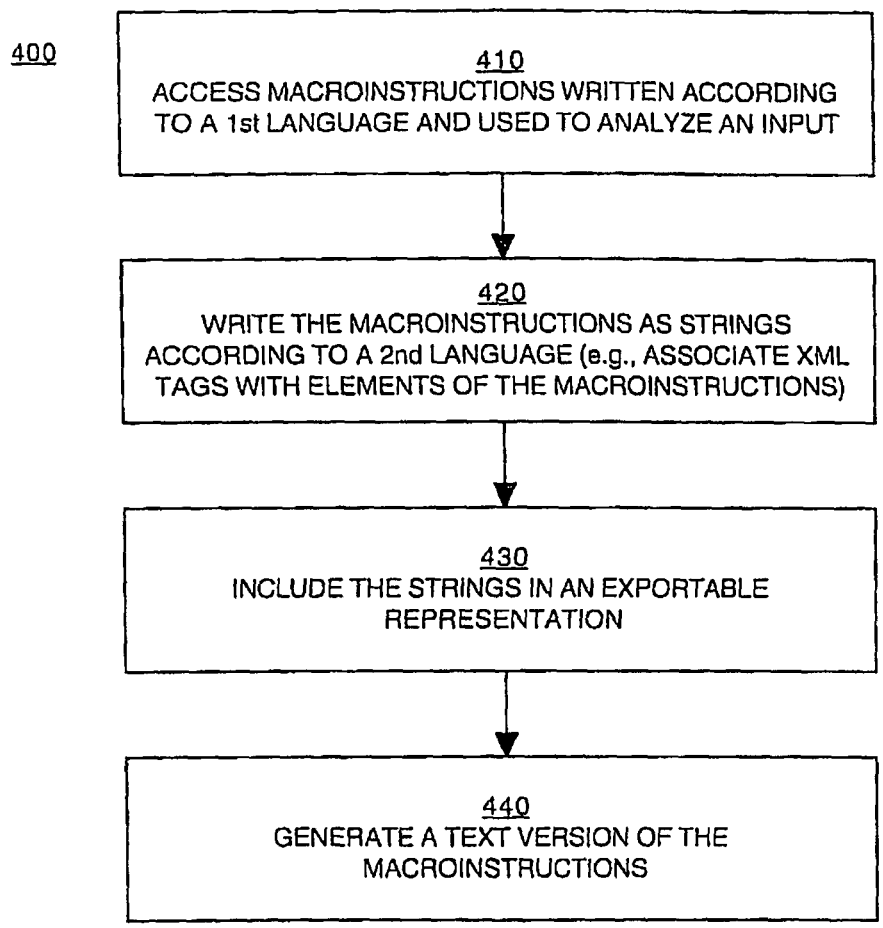
FIG. 4 is a flowchart of a method for extracting and manipulating parse chain information according to one embodiment of the present invention.

FIG. 4 is a flowchart 400 of a method for extracting and manipulating parse chain information according to one embodiment of the present invention. Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed. In one embodiment, flowchart 400 is implemented as computer-readable program code stored in a memory unit of computer system 112 and executed by processor 101 (FIG. 1).

In step 410 of FIG. 4, in one embodiment, macroinstructions that are used to analyze an input are accessed. In one embodiment, the input is a command that is entered in response to a command line interface prompt. In another embodiment, the macroinstructions define parse nodes in a data structure (e.g., a parse graph or a parse chain) that is used for testing the input for proper syntax. The macroinstructions are written according to a first computer system language. In one embodiment, the macroinstructions are written in a C language.

In step 420, in one embodiment, the macroinstructions are rewritten as strings according to a second computer system language. In one embodiment, XML tags are associated with elements of the macroinstructions, such that the macroinstructions are rewritten in an XML format.

In step 430, in one embodiment, the strings are included in an exportable representation. In one such embodiment, the exportable representation is an XML document. In step 440, in another embodiment, the strings are used to generate a textual version of the data structure.

Transforming a Parse Graph into an and/or Command Tree

Figure 5:
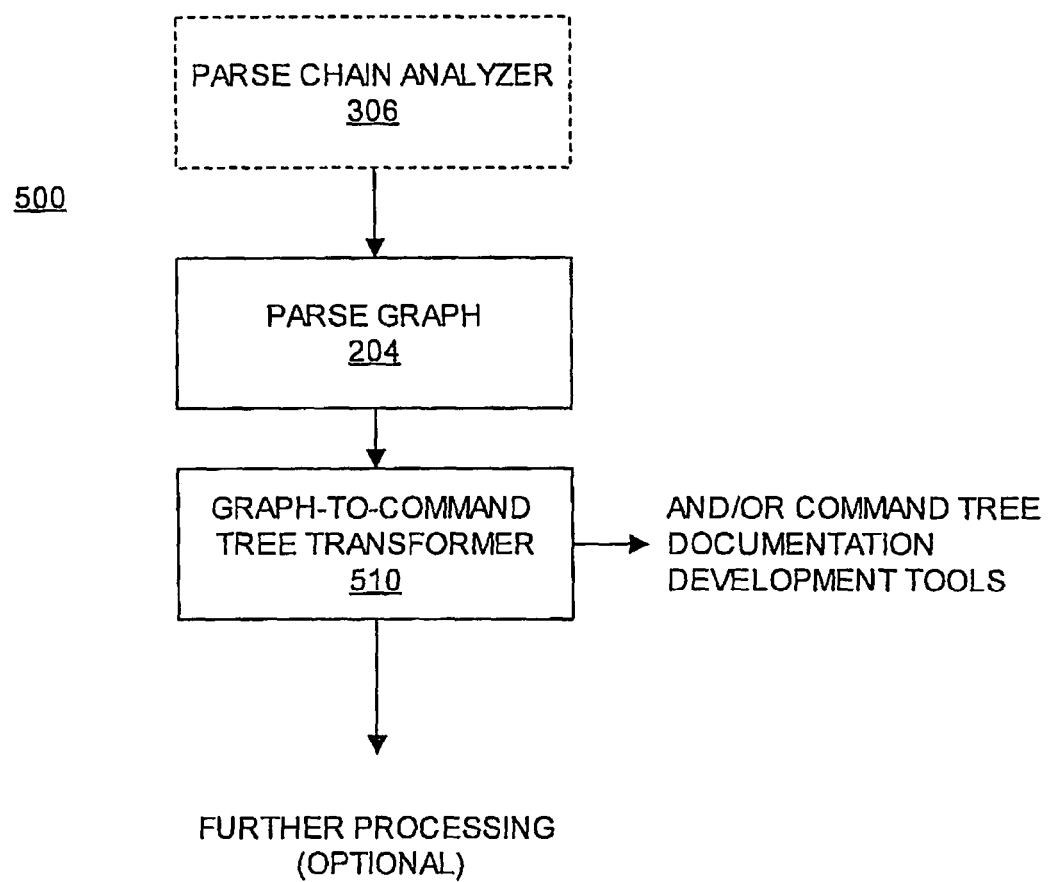
FIG. 5 is a block diagram of a system for transforming a parse graph into an AND/OR command tree according to one embodiment of the present invention.

FIG. 5 is a block diagram of a system 500 for transforming a parse graph into an AND/OR command tree according to one embodiment of the present invention. In the present embodiment, system 500 includes an optional parse chain analyzer 306, a parse graph 204, and a graph-to-command tree transformer 510. This portion of the present invention is used to better express the underlying CLI syntax by transforming parse graph 204 structure into a tree structure containing non-terminal AND/OR nodes that represent a sequence or choice of other AND/OR nodes or terminal token nodes.

The functionality of the optional parse chain analyzer 306 was previously described in conjunction with FIG. 3. One of the outputs of parse chain analyzer 306 is a parse graph 204. Parse graph 204 is a representation of CLI instructions. Parse graph 204 is an input to system 500.

Parse graph 204 contains branches. Each branch may have one or more nodes that allow the branch to fork out. Branches and nodes lead to or terminate in End of Line (EOL) nodes. Each branch, or node on a branch, of parse graph 204 that terminates in a common EOL node, translates into a command that is processed by the action function associated with that EOL node.

The graph-to-command tree transformer 510 operates by recursively traversing the branches in parse graph 204. While traversing several things are being done. Parse nodes within the branches of parse graph 204 that lead to or terminate in a common EOL node are collected into a command subtree rooted in an AND node. A command subtree set that shares common prefixes is created, and the branches that terminate in common EOL nodes are kept as a class. Nodes are collected based on their EOL because branches of parse graph 204 that terminate in common EOL nodes represent a single CLI command line.

Figure 6:
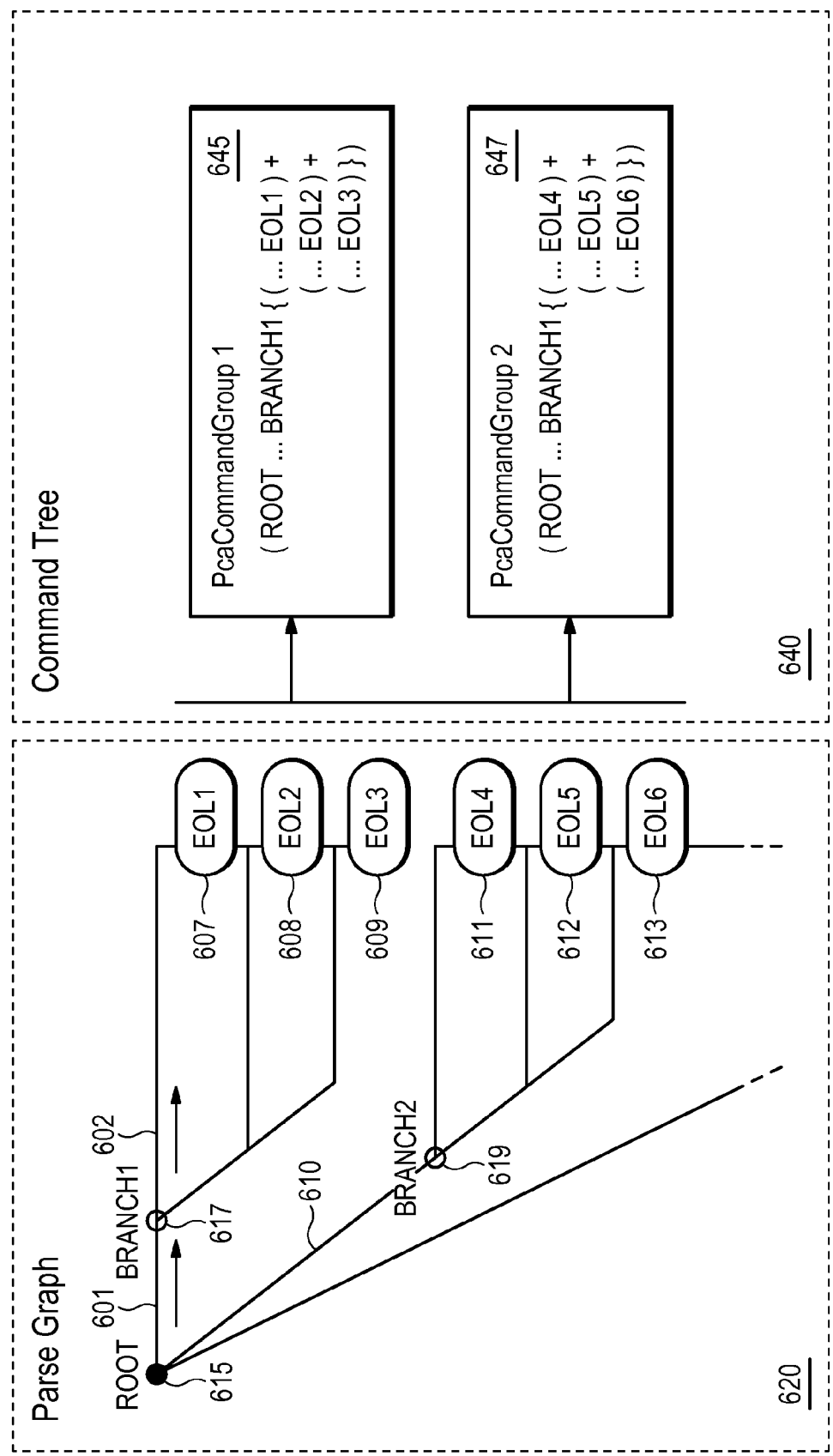
FIG. 6 is a block diagram of a parse graph-to-command tree node traversal according to one embodiment of the present invention.

FIG. 6 is a block diagram of a parse graph-to-command tree node traversal according to one embodiment of the present invention. FIG. 6 illustrates a simple example parse graph 620; with three parse nodes (615, 617 and 619). Parse node 615 is a root node, while parse nodes 617 and 619 are fork nodes. The parse graph 620 has two branches shown, branch one 601 and branch two 610. Branch one 601 is shown with three EOL nodes (607, 608, and 609). Branch two 610 is also shown with three EOL nodes (611, 612, and 613). The parse nodes (615, 617, and 619) in parse graph 620 are recursively traversed starting at a particular node continuing until a termination is reached. For example starting from root parse node 615 and traversing across branch 601, through fork node 617, across fork 602, and to the termination EOL1 607, constitutes a partial traversal of one path from the root parse node 615 to a termination point (such as 607). Each possible path way from a parse node such as the root node 615 or a fork node (such as 615) to a termination (such as EOL1 607) constitutes a parse node traversal that is performed in the parse graph-to-command tree traversal and transformation. Parse node traversals in other parse graphs could be more or less complex.

During the traversal portion of the graph-to-command tree transformation (510 of FIG. 5), one task that takes place is the conversion of parse graph branches into branches on a command tree. In FIG. 6, the converted branch 601 appears under the headings "PcaCommandGroup 1" 645 and the converted branch 610 appears under the heading "PcaCommandGroup 2" 647 in the AND/OR command tree 640. As part of the traversing, if commands in a parse graph branch are found to lead to a common EOL, they will be grouped together during the conversion. More complex parse graphs can involve nodes that are referenced from multiple points. This represents either a loop or a sharing of a common branch from different points in the parser graph.

With reference again to FIG. 5, a more in depth example of one operation that occurs during the traversal of parse graph 204 is shown by the example traversal of the command line shown in Table 4.

TABLE 4

An Example of a CLI Command Line

"mpls" "range" <min> [ "static" <static_min> <static_max> ]

Table 5 shows an example of a stand-alone AND/OR command tree representation of the CLI command line of Table 4. During traversal, over-arching command structures in parse graph 204 are identified, and at a lower level, definitions of commands are grouped based on a common root parse node.

TABLE 5

An Example of an AND/OR Tree Representation of a Command Line

Command-AND-node
{
   keyword ("mpls")
   keyword("label")
   keyword ("range")
   number (<min>)
   number (<max>)
   Data-AND-Node
     {
       keyword ("static")
       keyword (<static_min>)
       keyword (<static_max>)
     }
     eol (<mpls range function>)
}

Commands rooted in a common node generally share the same prefix. For example, the command "mpls label protocol" shares the same root node with the command "mpls label holddown" and the command "mpls label range." A complete AND/OR command tree that represents these three commands would group them together in a single container rooted to a single AND node. Table 6 shows an example representation of an AND/OR command tree of these three related commands.

TABLE 6

An Example of an AND/OR Command Tree of Three Commands Sharing a Root Node

Command-AND-node
{
   keyword ("mpls")
   keyword("label")
   Container-OR-node
   {
     Command-AND-node
     {
       keyword ("range")
       number (<min>)
       number (<max>)
       Data-AND-Node
       {
         keyword ("static")
         keyword (<static_min>)
         keyword (<static_max>)
       }
       eol (<mpls range function>)
     }
     Command-AND-node
     {
       keyword("protocol")
       options("tdp, ldp")
       ol(<mpls protocol function>)
     }
     Command-AND-Node
     {
       keyword ("holddown")
       number (<holddown time>)
       number(<interval>)
       eol (<mpls holddown function>)
     }
   }
}

In one embodiment of the present invention, as the traversing during graph-to-command tree transformation 510 takes place, some information in parse graph 204 is hidden from further processing. This hiding is done prior to the transformation from parse graph 204 to AND/OR command tree 206 (see FIG. 2). This hiding can be thought of as hiding the noise in parse graph 204. Hiding does not erase information in parse graph 204. Rather, hiding minimizes internal nodes in parse graph 204 that contain information unnecessary to the grammar of a CLI command, such as directions for implementing the command. After this "noise" is hidden, it is easier to identify the actual command nodes and their associated command attributes. Hiding the information about command implementation also simplifies the syntax of the commands in parse graph 204, which makes it easier to recognize patterns within the structure of the commands.

As the traversing takes place, some simplification occurs to prepare for conversion of commands from parse graph 204 to AND/OR command tree. This simplification is part of the graph-to-command tree transformer 510. The simplification reduces complex patterns within parse graph 204, and eliminates nodes that do not contribute to the overall structure of parse graph 204 or the commands in parse graph 204. Parse graph 204 is checked for patterns that indicate optional nodes, false nodes, alternate nodes, and nodes that can be skipped. The identified nodes are either simplified or eliminated from being transformed to the AND/OR command tree, according to simplification rules.

As the traversing continues, creation of individual branches on the AND/OR command tree takes place as part of the graph-to-command tree transformer (510 of FIG. 5). The building of the AND/OR command tree is an iterative process that happens piecemeal during the traversing, rather than all at once at the end of the traversing process. As parse graph 204 is traversed, and after a particular portion of the graph, branch on the graph, or node on the graph has had any possible hiding or simplification done to it, it is compared to a set of parse graph-to-command tree conversion cases. As matches are detected, conversions are made. Table 7 shows an example of a simple conversion case. Table 7 shows that when a parse graph pattern matching the pattern shown under the heading "Parse Graph" is detected, it is converted to the pattern shown under the heading "Command Tree." The converted command is then added to the AND/OR command tree that is being created. There are many more conversion cases, describing conversions for known cases or patterns in parse graph 204 command structures. The conversion cases are selectively applied based on how the portion of a branch on parse graph 204 that is currently being analyzed by the traversal fits into the overall hierarchy of parse graph 204.

TABLE 7

An Example of a Parse Graph-to-Command Tree Conversion Case

| Parse Graph | Command Tree |
| --- | --- |
| A - B - C - EOL<br>\|<br>EOL | A. (B + C) |

After parse graph 204 has been traversed and the AND/OR command tree has been built, refining of the AND/OR tree structure takes place. One phase of the refining is simplification of the AND/OR command tree branches. Each branch is analyzed for ways that the AND/OR expressions within it can be simplified according to rules of logical operation. Logical operations such as factoring out, eliminating optional nodes, and simplifying take place, according to a selected set of AND/OR command tree simplification cases. Table 8 is not an inclusive list of all possible simplifications, but it shows some before and after example cases of AND/OR command tree simplification.

TABLE 8

AND/OR Command Tree Simplification Case Examples

| Case | Before | After |
| --- | --- | --- |
| Factor Out Suffix | ((A · X) + (B · X) + (C · X)) | ((A + B + C) · X) |
| Merge Single Node | (A · (B)) | (A · B) |
| Merge Empty Node | (A ( )) | (A) |
| Merge Subtrees | (A + (B + C)) | (A + B + C) |
| Merge Subtrees | (A · (B · C)) | (A · B · C) |

Another simplification operation that takes place is merger of duplicated branches. This is similar to the logical mergers that are performed on a single branch in Table 8. Normally, the branches of the parse graph that leads to a common EOL node are contiguous; when a new EOL node is seen the line for the previous EOL is completed. However updates to the parser code may result in non-contiguous branches of parser graph that lead to the same EOL. When a line or branch on the AND/OR command tree is created, it is checked to see if there is an existing branch that terminates on the same EOL. If there is, the existing line and new line need to be merged. If the existing line is part of a command group that contains another EOL, it is extracted from that command group before being merged with the new line. The lines are then merged together according to logical rules, which merge together common prefixes, suffixes, or pre-fixes and suffixes shared by the lines. Table 9 shows an example of merging an existing line and new line that share common prefixes. Table 9 also shows an example of merging an existing line and new line that share common suffixes. Many other merger cases are possible based on variations in prefixes, suffixes, or both.

TABLE 9

Command Tree Merger Case Examples

| Case | Before | After |
| --- | --- | --- |
| Merge Prefix | Existing:<br>A · B · C {D · E · F · EOL1} (...)}<br>New:<br>A · B · G · D · E · F · EOL1 | A · B · (C + G) ·<br>D · E · F · EOL1 |
| Merge Suffix | Existing:<br>A · B · C {D · E · F · EOL1} (...)}<br>New:<br>A · B · C · X · Y · Z · EOL1 | A · B · C · ((D · E · F) +<br>(X · Y · Z)) · EOL1 |

The graph-to-command tree transformer (510 in FIG. 5) iteratively creates an AND/OR command tree in XML. After completion of graph-to-command-tree transformation 510 an exportable representation of the AND/OR command tree exists. Optionally, this exportable representation can be exported as is, or can be converted to other languages. Optionally, this exportable representation can be modified for use as a documentation tool and/or as a development tool. Optionally, this exportable representation can be processed further.

Figure 7:
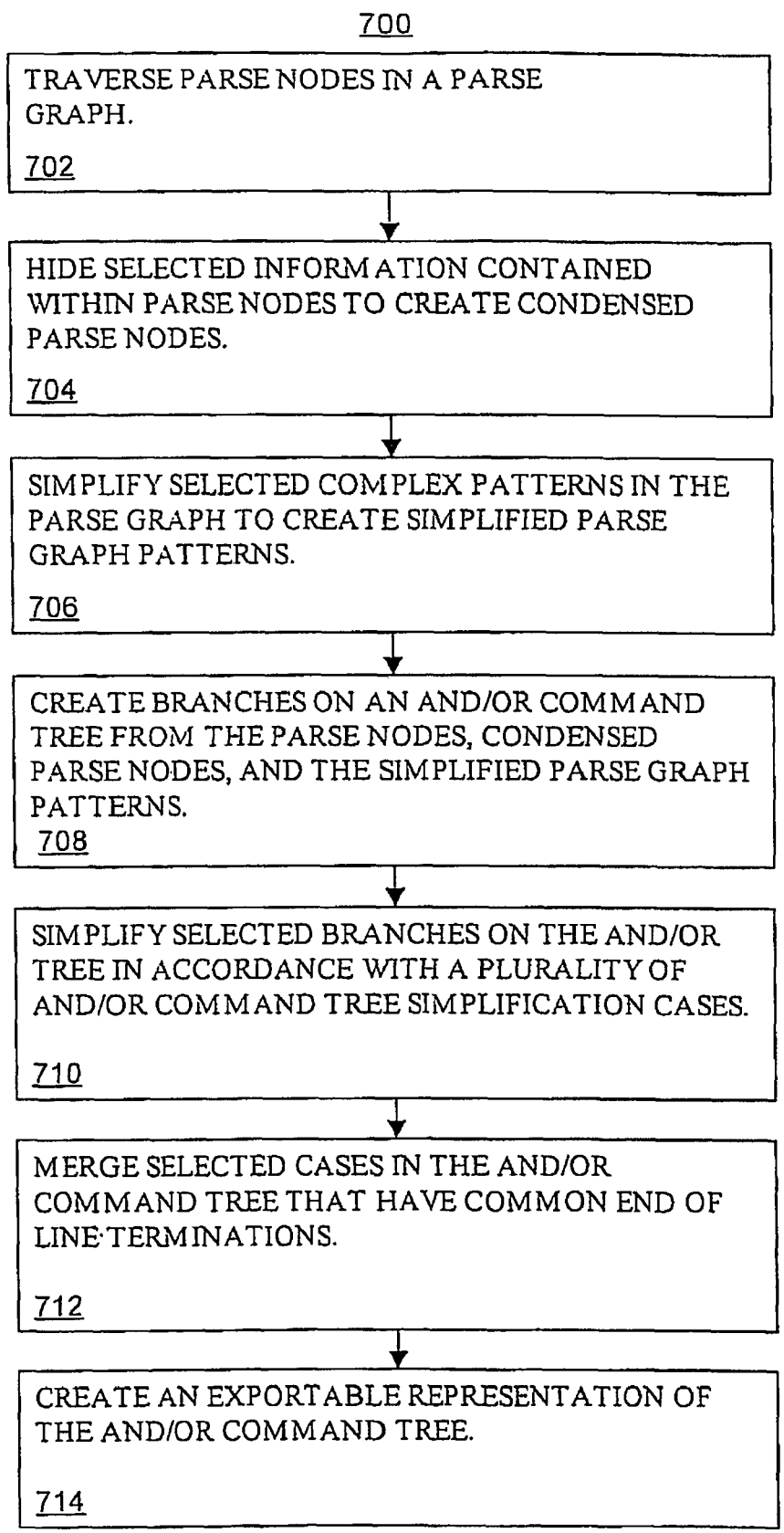
FIG. 7 is a flowchart of a method for transforming a parse graph into an AND/OR command tree according to one embodiment of the present invention.

FIG. 7 is a flowchart 700 of a method for transforming a complex representation of computer code into a simplified representation of computer code. Although specific steps are disclosed in flowchart 700, such steps are exemplary. That is, embodiments of the present invention are well suited to performing various other (additional) steps or variations of the steps recited in flowchart 700. It is appreciated that the steps in flowchart 700 may be performed in an order different than presented, and that not all of the steps in flowchart 700 may be performed. In one embodiment, flowchart 700 is implemented as computer-readable program code stored in a memory unit of computer system 112 and executed by processor 101 (FIG. 1).

In step 702 of FIG. 7, in one embodiment, parse nodes in a parse graph are traversed. The parse nodes are traversed depth-wise, to the EOL nodes at the end of each traversed branch. The parse nodes are also traversed breadth wise, to get an overview of the graph and detect an overarching command structure or structures in the parse graph. As the traversing takes place, parse nodes that terminate in a common EOL are identified. The identified parse nodes are collected into groups or sets. The groups/sets are converted into branches on an AND/OR command tree, with each group/set rooted in a common AND node on the command tree.

In step 704 of FIG. 7, in one embodiment, selected information, contained within parse nodes, is hidden to create condensed pares nodes. The information in the parse nodes of the parse graph is not deleted, but merely hidden to prevent further processing during follow on portions of the transformation from parse graph to AND/OR command tree. Information about how to carry out commands is hidden or de-emphasized, so that the actual commands, and patterns associated with the actual commands, are easier to discern.

In step 706 of FIG. 7, in one embodiment, selected complex patterns in the parse graph are simplified to create simplified parse graph patterns. The simplification is done piecemeal on whatever portion of the parse graph is being analyzed during the traversal. In other words, one branch or one portion of a branch in the parse graph is simplified at a time. Other processes can then be applied to the simplified piece of the parse graph, before traversing to another portion of the parse graph. Simplification is done by comparing patterns in portions of the parse graph with known simplification cases, to determine which nodes can be skipped or eliminated during follow-on conversion steps. Simplification makes patterns associated with commands in the parse graph easier to identify and convert into AND/OR command tree equivalents.

In step 708 of FIG. 7, in one embodiment, branches on an AND/OR command are created from parse nodes, condensed parse nodes, and the simplified parse graph patterns. As traversing continues, and after simplification and hiding have been accomplished (if applicable), portions of the parse graph are converted into AND/OR command tree branches. Cases that are applicable to the portion of the parse graph being traversed are compared to the portion of the parse graph. When a case matches, that portion of the parse graph (which may contain hidden or simplified information) is converted to an AND/OR command tree equivalent.

In step 710 of FIG. 7, in one embodiment, selected branches on the AND/OR command tree are simplified in accordance with a plurality of AND/OR command tree simplification cases. This is done to refine the command tree, and is done iteratively as each piece of the command tree is constructed. These simplifications are logical simplifications. A non-inclusive list of example simplifications is shown and described in conjunction with Table 8.

In step 712 of FIG. 7, in one embodiment, selected cases in the AND/OR command tree that have common end of line terminations are merged. This is an iterative process that is done as cases are created. If a newly created branch or line is found to share a common EOL with a previously created line or branch, the cases are merged. A non-inclusive list of example merger cases is shown and described in accordance with Table 9.

In step 714 of FIG. 7, in one embodiment, an exportable representation of the AND/OR command tree is created. This exportable representation can be in XML, which is what is used to create the AND/OR command tree during the graph-to-command tree transformation (510 of FIG. 5). Optionally, some embodiments of the present invention can have exportable representations of the AND/OR command tree in other languages. Optionally, other exportable products can be created for use as development tools and/or documentation tools. Optionally, the AND/OR tree can be exported for further processing.

Transforming an and/or Command Tree into a Command Data Model

Figure 8:
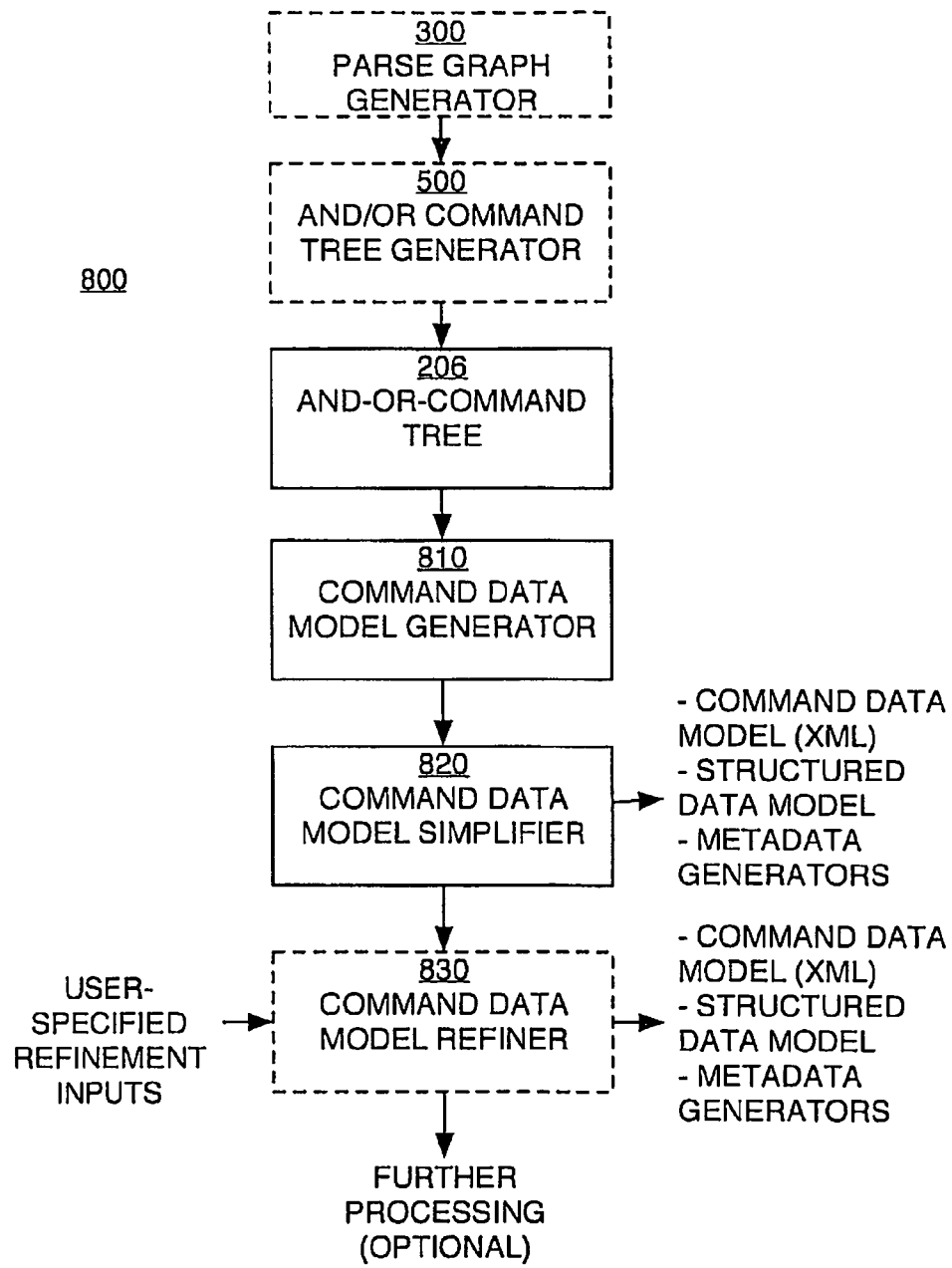
FIG. 8 is a block diagram of a system for transforming an AND/OR command tree into a command data model according to one embodiment of the present invention.

FIG. 8 is a block diagram of a system 800 for transforming an AND/OR command tree into a command data model, in order to clearly express the AND/OR command tree structure containing non-terminal AND/OR nodes as a command data model of CLI commands that can be used as an operational tool, a development tool, or as a foundation for other models. In the present embodiment, system 800 includes an optional parse graph generator 300, an optional AND/OR command tree generator 500, an AND/OR command tree 206 as an input, a command data model generator 810, a command data model simplifier 820, and a optional command data model refiner 830. The work being performed by system 800 is unique, in the sense that the CLI instructions taken as an initial input source to parse graph generator 300 do not have to be designed with a command data model in mind. The present system and method facilitate the incremental generation of a command data model from source code that was designed without a model in mind.

System 300, which was previously described in conjunction with FIG. 3, is used in one embodiment of the present invention to generate a parse graph 204 from CLI instructions. System 300, the parse graph generator, is an optional part of system 800. System 300 is coupled to the input of system 500.

System 500, which was previously described in conjunction with FIG. 5, is optionally used in one embodiment of the present invention to generate an AND/OR command tree 206 of CLI instructions from a parse graph 204 of CLI instructions. AND/OR command tree 206 is an input for command data model generator 810.

AND/OR command tree 206 was previously described in conjunction with FIG. 2. AND/OR command tree 206 is a representation of CLI instructions that serves as a starting data file for what will eventually become a command data model. In some embodiments of the present invention, AND/OR command tree 206 is represented as an XML file. AND/OR command tree 206 is used as an input to command data model generator 810.

Figure 9:
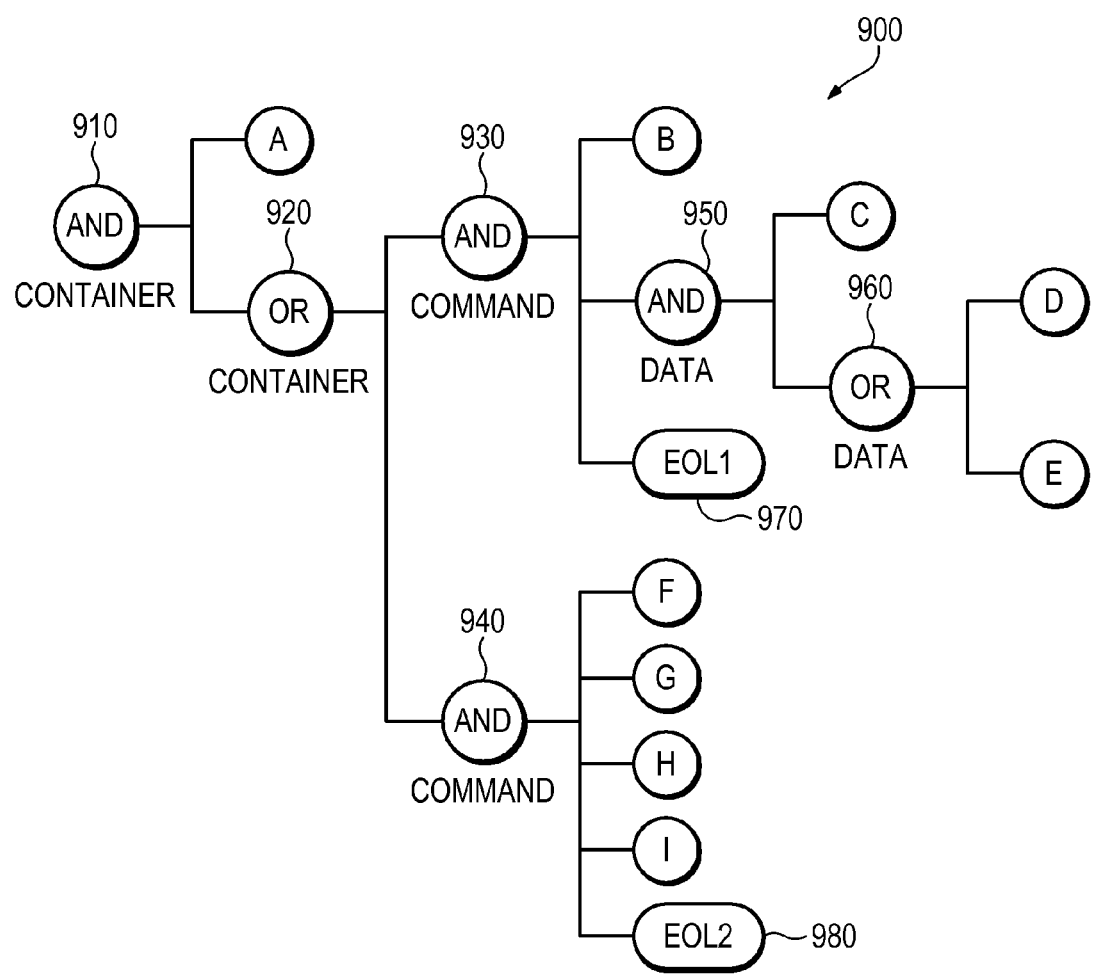
FIG. 9 illustrates an example AND/OR command tree block diagram according to one embodiment of the present invention.

FIG. 9 illustrates an example AND/OR command tree block diagram 900. AND/OR command tree block diagram 900 shows an example of an AND/OR tree with several levels of hierarchy. Logical operator nodes (ANDs and ORs) at different levels within the hierarchy of AND/OR command tree block diagram 900 serve different functions. Some logical operator nodes such as AND node 910 and OR node 920 serve as containers for containing commands and data. Some logical operator nodes such as AND node 930 and AND node 940 serve as command nodes for expressing commands. Some logical operator nodes such as AND node 950 and OR node 960 serve as data nodes for expressing data. The EOL1 node 970 represents a terminal node associated with command AND node 930. The EOL2 node 980 represents a terminal node associated with command AND node 940. The function of each particular node in an AND/OR command tree is taken into account when the command data model is generated by command data model generator 810.

TABLE 10

Example AND/OR Command Tree Structures Represented in Modified EBNF

| | | |
|---|---|---|
| CommandTree | : | ( Container-AND-node \| Command-AND-node ) + |
| Container-AND-node | : | ( Token-node* Container-OR-node ) |
| Container-OR-node | : | ( Command-AND-node ) + |
| Command-AND-node | : | ( Token-node \| Data-AND-node \| Data-OR-node ) * EOL-node |
| EOL-node | -> | ( Container-AND-node ) * |
| Data-AND-node | : | ( Token-node \| Data-OR-node ) + |
| Data-OR-node | : | ( Token-node \| Data-AND-node ) + |

The structure of the AND/OR command tree, which is the source for the command data model can be described using modified Extended Backus-Naur-Form (EBNF) notation with ":" denoting containment and "→" denoting reference. Table 10 shows Examples of various AND/OR command tree structures such as Container-AND-nodes and Data-AND-nodes represented with this modified EBNF notation.

The structure of the generated command data model (and the structured data model if one is generated) can also be described using a modified EBNF notation with ":" denoting containment and "–" denoting reference. Table 11 shows examples of command data model structures represented in modified EBNF.

TABLE 11

Example Command Data Model Structures Represented in Modified EBNF

| | | |
|---|---|---|
| 1. Component | : | ( ContainerObjectClass )+ |
| 2. ContainerObjectClass | : | ( CommandAttribute | ContainerAttribute ) + |
| 3. CommandAttribute | : | ( SimpleTypedCommandAttribute | ComplexTypedCommandAttribute ) |
| 4. ComplexTypedCommandAttribute | - | CommandDataObjectClass |
| 5. ContainerAttribute | - | ContainerObjectClass |
| 6. CommandDataObjectClass | := | ( SequenceCommandDataObjectClass | ChoiceCommandDataObjectClass ) |
| 7. CommandDataObjectClass | : | ( DataAttribute )+ |
| 8. DataAttribute | := | ( SimpleTypedDataAttribute | ComplexTypedDataAttribute ) |
| 9. ComplexTypedDataAttribute | - | DataObjectClass |
| 10. DataObjectClass | := | ( SequenceDataObjectClass | ChoiceDataObjectClass ) |
| 11. DataObectClass | : | ( DataAttribute )+ |

In Table 11, item 1 shows that Components consist of one or more ContainerObjectClass data types. ContainerAttributes are simply attributes whose data type is another ContainerObjectClass. Item 2 of Table 11 shows that ContainerObjectClass data types, which are like directories, can contain CommandAttributes or ContainerAttributes. Item 3 of Table 11 shows that CommandAttributes can contain a SimpleCommandAttributes or ComplexCommandAttributes. A CommandAttribute is an attribute that represents one complete CLI command. A SimpleCommandAttribute is one that has a simple value such as a basic data type like "number" or "Boolean." A complex data type means that the data type is another ObjectClass.

Line 4 of Table 11 shows that ComplexCommandType references another DataObjectClass at the command level. Line 5 of Table 11 is similar to Line 2, and shows that a ContainerAttribute can reference a ContainerObjectClass. Line 6 of Table 11 shows that a CommandDataObjectClass can contain, either a SequenceCommandDataObjectClass or a ChoiceCommandDataObjectClass. Line 7 of Table 11 shows that a CommandDataObjectClass contains one or more CommandAttributes. Line 8 of Table 11 shows that a DataAttribute contains a SimpleTypedDataAttribute or a ComplexTypedDataAttribute. Line 9 of Table 11 shows that a ComplexTypedDataAttribute references a DataObjectClass. Line 10 of Table 11 shows that a DataObjectClass contains a SequenceDataObjectClass or a ChoiceDataObjectClass. Line 11 of Table 11 shows that a DataObjectClass contains one or more DataAttributes.

Command data model generator 810, of FIG. 8, follows a selected set of transformation rules to generate a command data model from AND/OR command tree 206. The resulting command data model is generated by expressing AND/OR command tree 206 as a command tree written in a notation using elements of EBNF (Extended Backus-Naur-Form). This EBNF command tree represents an unsimplified command data model that needs to be evaluated for possible simplification and optionally for possible refinement before the command data model enters its final form. The reference point for model generation is the Command-AND-node (such as node 930 of FIG. 9), which contains an EOL node (such as node 970 of FIG. 9) as its terminal element and represents a distinct CLI command. Because CLI commands can be very complex, some areas of AND/OR command trees can be more complex than illustrated in FIG. 9.

Table 12 shows a basic set of generation rules used to generate the command data model from the AND/OR command tree. These rules are used in a majority of cases, but occasionally rare exceptions will require special handling. For instance, a Command-AND-node is derived with the assumption that it only contains a command that does one function. A special case would be a Command-AND-node that contained several functions. This special case requires the Command-AND-node to be broken down at an inner node rather than at the Command-AND-node level.

TABLE 12

Basic Command Data Model Generation Rules

| | |
|---|---|
| 1. Command-AND-node = | (SimpleTypedCommandAttribute| ComplexTypedCommandAttribute – CommandObjectClass) |
| 2. Data-AND-node = | (SimpleTypedCommandAttribute| ComplexTypedCommandAttribute – SequenceDataObjectClass) |
| 3. Data-OR-node = | ComplexTypedDataAttribute – ChoiceDataObjectClass |
| 4. Container-AND-node = | ContainerObjectClass |

Line 1 of Table 12 shows that a Command-AND-node translates either to a SimpleTypedCommandAttribute or to a ComplexTypedCommandAttribute that references a CommandObjectClass. This corresponds to a CLI that is really simple, such as a keyword followed by a single parameter. Line 2 of Table 12 shows that a Data-AND-node translates to either a SimpleTypedCommandAttribute or a ComplexTypedCommandAttribute that references a SequenceDataObjectClass. A sequence exists because of the AND. Line 3 of Table 12 shows that a Data-OR-node translates to a ComplexTypedDataAttribute referencing a CoiceDataObjectClass. A choice exists because of the OR. Line 4 of Table 12 shows that a Container-AND-node translates to a ContainerObjectClass.

Table 13 shows an example AND/OR command tree for the "mpls label" command. Adding more commands would make the AND/OR command tree much larger. The AND/OR command tree represented in Table 13 is the starting point for the follow on examples shown in Table 14, Table 15, and Table 17.

TABLE 13

Example AND/OR Command Tree

```
Container-AND-node
{
    keyword("mpls")
    keyword("label")
    Container-OR-node {
        Command-AND-node
        {
            keyword("range")
            number(<min)
```

TABLE 13-continued

Example AND/OR Command Tree

```
            number(<max)
            Data-AND-node
            [
                keyword ("static")
                number (<static_min)
                number (<static_max)
            ]
        ]
            eol (<mpls range function>)
        }       Command-AND-node
        {
            keyword("protocol")
            options("tdp, ldp")
            eol (<mpls protocol function>)
        }
        Command-AND-node
        {
            keyword("holddown")
            number(<holddown time)
            number(<interval)
            eol (<mpls holddown function>)
        }
        Command-AND-node
        {
            keyword("explicit-null")
            Data-OR-node
            [
                Data-AND-node
                (
                    keyword("for")
                    string(<cfg_mpls_adv_enull_for_acl>)
                    Data-AND_node
                    [
                        "to"
                        string(<cfg_mpls_adv_enull_for_to_acl>)
                    ]
                )
                Data-AND-node
                (
                    "to"
                    string(<cfg_mpls_adv_enull_to_acl>)
                    Data-AND-node
                    [
                        "for"
                        string(<cfg_mpls_adv_enull_to_for_acl>)
                    ]
                )
            ]
            eol (<ldp expnull advert function>)
        }
    }
}
```

Table 14 shows an example of an unsimplified command data model. Command data model generator 810 (FIG. 8) uses a Java/C++ like syntax and EBNF like notation combined with model generation terminologies and rules similar to those introduced in Table 12, to generate the example unsimplified command data model, shown in Table 14, from the "mpls label" AND/OR command tree in shown in Table 13. In one embodiment of the present invention, the unsimplified command data model generated by command data model generator 810 is output as an XML file. In another embodiment, the unsimplified command data model generated by command data model generator 810 is evaluated for simplification and optionally for refinements. The command data model shown in Table 14 can then be evaluated for possible simplifications and optionally for user-specified refinements.

TABLE 14

Example Unsimplified Command Data Model

```
Component mpls {
    ConainerObjectclass n_config_mpls_commands {
        ComplexTypedCommandAttribute mpls_label_range;
        CommandDataObjectClass mpls_lable_range {
            uint32    min;
            uint32    max;
            ComplexTypedDataAttribute
n_cfg_mpls_label_rnge_static_cfg_mpls_label_rnge_static_max;
            SequencDataObjectClass
n_cfg_mpls_label_rnge_static_cfg_mpls_label_rnge_static_max [
                boolean   static;
                uint32    min;
                uint32    max;
            ]
        }
        SimpleTypedCommandAttribute mpls_label_protocol enum {
            tdp=TAG_PTCL_TDP
            ldp=TAG_PTCL_LDP
        }
        ComplexTypedCommandAttribute  mpls_label_holddown;
        CommandDataObjectClass  mpls_label_holddown {
            uint32    time;
            uint32    intv;
        }
        ComplexTypedCommandAttribute  mpls_ldp_explicit-null;
        ChoiceCommandDataObjectClass  mpls_ldp_explicit-null {
            ComplexTypedDataAttribute       for;
            SequenceDataObjectClass         for [
                string    for_acl;
                ComplexTypedDataAttribute
n_cfg_mpls_adv_enull_for_to_cfg_mpls_adv_enull_for_to_acl;
                SequenceDataObjectClass
n_cfg_mpls_adv_enull_for_to_cfg_mpls_adv_enull_for_to_acl {
                    string to;
                ]
            ]
            ComplexTypedDataAttribute       to;
            SequenceDataObjectClass         to [
                string to_acl;
                ComplexTypedDataAttribute
n_cfg_mpls_adv_enull_to_for_cfg_mpls_adv_enull_to_for_acl [
                    string    for;
                ]
            ]
        } - }
}
```

Command data model simplifier 820 (FIG. 8) follows selected simplification rules to simplify expressions and flatten the hierarchy of the unsimplified command data model generated by command data model generator 810. Simplification is done to create attributes that are not too deeply nested. Each structure in the unsimplified model is analyzed and, if applicable, a simplification or flattening rule is applied selectively to the analyzed structure. Command data model simplifier 820 generates the simplified command data model shown in Table 15 by simplifying the hierarchy under the CommandDataObjectClass, shown in Table 14. In the example shown in Table 14, the "mpls_label_range" and the "mpls_ldp_explicit-null" object classes each have two hierarchies. In other embodiments of the present invention, using more complex CLIs can lead to more hierarchies. The "mpls_ldp_explicit-null" example shows the difference in the unrefined command data model of Table 14 as compared to the simplified command data model of Table 15. In the example model shown in Table 14, the ordering represented by "for" and "to" is not important to the model, and in fact the cases "for" and "to" have the same meaning. This allows for simplification in the transition between the unsimplified model shown in Table 14 and the simplified command data model shown in Table 15.

TABLE 15

Example Simplified Command Data Model

```
Component mpls   {
    ContainerObjectClass n_config_mpls_commands {
        ComplexTypedCommandAttribute    mpls_label_range;
        CommandDataObjectClass          mpls_lable_range {
            uint32      min;
            uint32      max;
            [uint32     static_min];
            [uint32     static_max];
            [boolean    static];
        }
        SimpleTypedCommandAttribute mpls_label_protocol enum {
            tdp=TAG_PTCL_TDP
            ldp=TAG_PTCL_LDP
        }
        ComplexTypedCommandAttribute    mpls_label_holddown;
        CommandDataObjectClass          mpls_label_holddown {
            uint32      time;
            uint32      intv;
        }
        ComplexTypedCommandAttribute mpls_ldp_explicit-null;
        SequenceCommandDataObjectClass mpls_ldp_explicit-null [
            [string    m_for_acl_for]
            [string    m_to_to_acl]
        ] /* mpls_ldp_explicit-null */
        ...
    }
}
```

During simplification, command data model simplifier 820 invokes simplification logic and rules to remove any attributes that are duplicated or unnecessary based on their mapping to the data structure. While simplifying, flattening of "CommandDataObjectClass" to less than "n" levels (where "n" represents a small number such as 1, 2, or 3) is also accomplished. Simplification creates opportunities for flattening the model. The model as represented in Table 15 is a flattened and simplified representation of the model as represented in Table 14. It is important during simplifying to flatten all attributes that map to the same command state block member (which is the parse node containing the action to be performed). Table 16 shows a short list of example simplification and flattening rules used by command data model simplifier 820 to simplify an unsimplified command data model. Table 16 is not an inclusive list; other simplification and flattening rules not listed in Table 16 can also be implemented.

TABLE 16

Examples of Simplification Instructions

1. Remove duplications: Duplicate attributes with the same name and same type are removed
2. Collapse nested unions: nested unions from (A + (B + C)) command tree pattern will not happen because of command tree simplification, however there are other patterns that can lead to nested unions. These nested unions must be collapsed if the members all point to the same command state block data.
3. Merge integers: Integers that go to the same command state block data structure that contains parse information for use in the components action function are merged. Range constrains of the newly merged integer are taken from the minimum of the lower value and the maximum of the upper value.
4. Flatten single child object or union: objects and unions that have only a single child (as the result of a previous simplification) are flattened.

In one embodiment of the present invention, an output from command data model simplifier 820 is a command data model. In one embodiment, an output from command data model simplifier is 820 is a command data model expressed in XML. In one embodiment, an output from the command data model simplifier 820 is a structured data model. In one embodiment, an output of command data model simplifier 820 is used as a metadata generator. In one embodiment, the output of the command data model simplifier 820 is sent on to command data model refiner 830 for automated and user-specified refinements.

In one embodiment of the present invention, an optional command data model refiner 830 (FIG. 8) is used to refine the simplified command data model. Names of structures and objects are generated automatically during earlier portions of the command data model creation process, and are often given temporary names. Because of this, it is often useful for a user to customize the command data model for a particular system or application that it is being used with. The abstract command data model is made more specific by allowing user-specified renaming of objects and structures with names meaningful to the user. Command data model refiner 830 allows structures and objects to be renamed or refined. In one embodiment, some of the refinements are automated after the user specifies instructions on how to name or describe structures and objects. In one embodiment, some refinements are user-specified using an XML refinement file that is edited manually to rename objects and structures and to perform manual simplifications. Command data model refiner 830 reads the refinement file, and the command data model is then regenerated with the user-specified refinements.

An example of a user-specified refinement is shown in Table 17. Note how the "n_config_mpls commands" container object class and the two attributes under "mpls_ldp_explicit-null" have been renamed in the refined model shown in Table 17, as compared to the simplified model shown in Table 15.

TABLE 17

Example Refined Command Data Model

```
Component mpls {
    ContainerObjectClass mpls_global {
        ComplexTypedCommandAttribute    mpls_label_range;
        CommandDataObjectClass          mpls_lable_range {
            uint32      min;
            uint32      max;
            [uint32     static_min];
            [uint32     static_max];
            [boolean    static];
        }
        SimpleTypedCommandAttribute mpls_label_protocol enum {
            tdp=TAG_PTCL_TDP
            ldp=TAG_PTCL_LDP
        }
        ComplexTypedCommandAttribute    mpls_label_holddown;
        CommandDataObjectClass          mpls_label_holddown {
            uint32      time;
            uint32      intv;
        }
        ComplexTypedCommandAttribute    mpls_ldp_explicit-null;
        ChoiceCommandDataObjectClass    mpls_ldp_explicit-null [
            [string    for]
            [string    to]
        ] /* mpls_ldp_explicit-null */
        ...
    }
}
```

Other user-specified refinements such as manual simplifications can be specified and the preformed via the command data model refiner 830. In one embodiment, an output from command data model refiner 830 is a command data model. In one embodiment, an output from command data model refiner 830 is a command data model expressed in XML. In one embodiment, an output from the command data model refiner 830 is a structured data model. In one embodiment, an output of command data model refiner 830 is used as a metadata generator.

Figure 10:
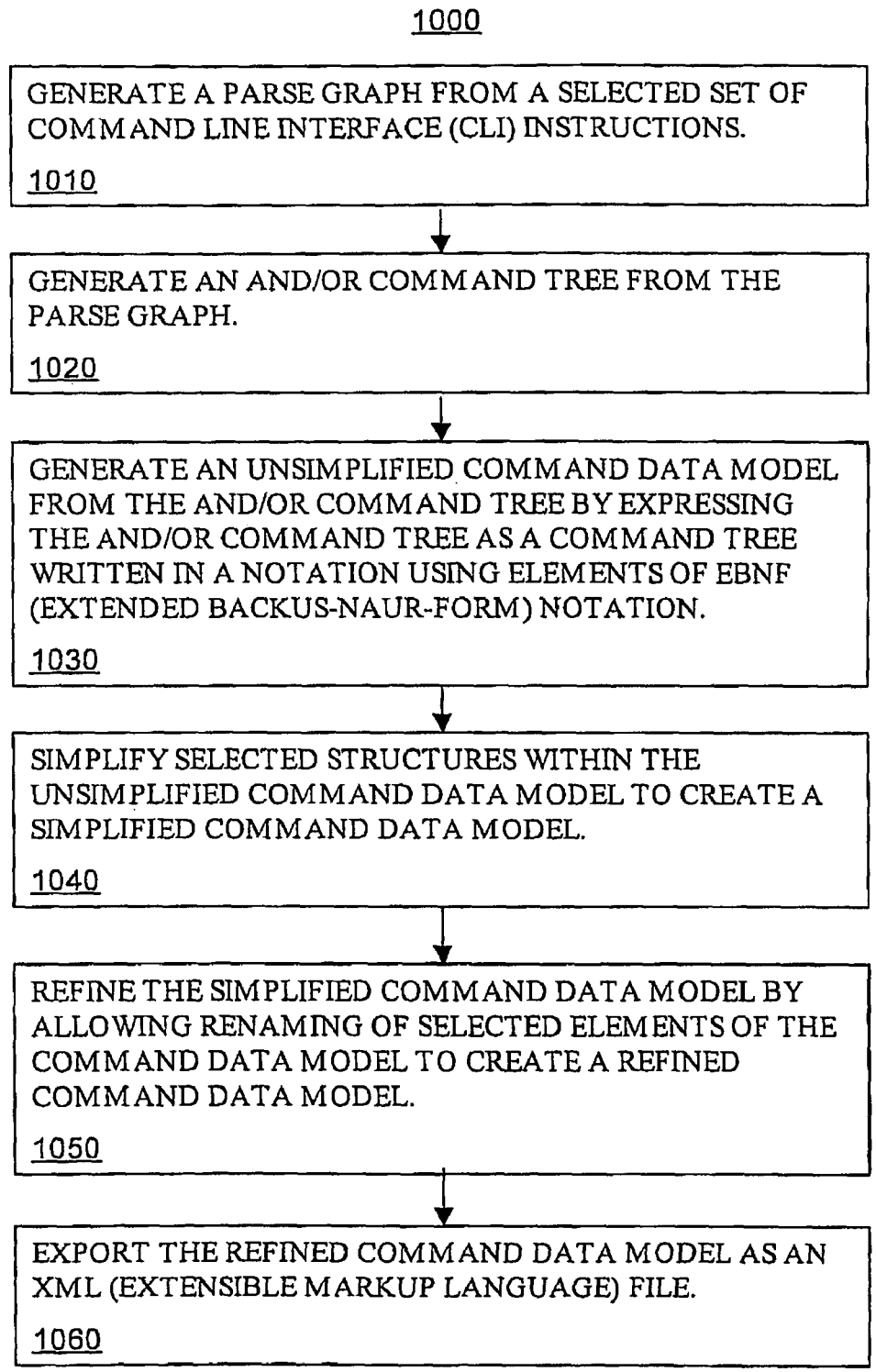
FIG. 10 is a flowchart of a method for transforming an AND/OR command tree into a command data model according to one embodiment of the present invention.

FIG. 10 is a flowchart 1000 of a method for transforming an AND/OR command tree into a command data model according to one embodiment of the present invention. Although specific steps are disclosed in flowchart 1000, such steps are exemplary. That is, embodiments of the present invention are well suited to performing various other (additional) steps or variations of the steps recited in flowchart 1000. It is appreciated that the steps in flowchart 1000 may be performed in an order different than presented, and that not all of the steps in flowchart 1000 may be performed. In one embodiment, flowchart 1000 is implemented as computer-readable program code stored in a memory unit of computer system 112 and executed by processor 101 (FIG. 1).

In 1010 of FIG. 1000, in one embodiment, a parse graph is generated from a selected set of CLI (command line interface) instructions.

In 1020 of FIG. 1000, in one embodiment, an AND/OR command tree is generated from a parse graph of CLI instructions.

In 1030 of FIG. 1000, in one embodiment, an unsimplified command data model is generated from an AND/OR command tree by expressing the AND/OR command tree as a command tree written in a notation using elements of EBNF (Extended Backus-Naur-Form) notation. The generation is done by following a set of transformation rules to transform structures in the AND/OR command tree into structures in the unsimplified command data model.

In 1040 of FIG. 1000, in one embodiment, selected structures within the unsimplified command data model are simplified to create a simplified command data model. Selected simplification rules are applied to selected structures that fit the case expressed by the selected rule. As simplification takes place, flattening of the hierarchy of the command data model is also performed. Flattening is also done according to selected simplification rules. Flattening is done to remove duplicate attributes and to remove or merge attributes that are mapped to perform the same action.

In 1050 of FIG. 1000, in one embodiment, the simplified command data model is refined by allowing renaming of selected elements of the command data model to create a refined command data model. In one embodiment, some of the refining is automated. In one embodiment, some of the refinement is manually performed. In one embodiment, user-specified renaming of elements and structures is allowed so that the command data model can be more customized for use with a particular network, computer system, or application. In one embodiment, user-specified manual simplification of objects or structures in the command data model is allowed. In one embodiment, user-specified refinements are performed in an XML (extensible markup language) file, and the command data model is then regenerated with the refinements specified in this XML file.

In 1060 of FIG. 1000, in one embodiment, the refined command data model is exported as an XML file. In other embodiments, the command data model can be exported in other file formats. In one embodiment the refined command data model is exported as a structured data model. In one embodiment, the command data model is exported for use in metadata generation.

In summary, embodiments in accordance with the present invention provide methods and systems for extracting information contained in C files, C chain files, C macros and C header files and for transforming that information into an externally usable parse graph in the form of an XML document. Significantly, this can be accomplished without a specialized C-language compiler; instead, the C-language constructs are run through a preprocessor (e.g., preprocessor 304 of FIG. 3) and the results are tagged with XML script. The extracted parse graph can be transformed into an AND/OR command tree in the form of an XML document. The extracted parse graph, AND/OR command tree, and related information can be used, for example, in external management systems, for validation of CLI syntax before product delivery, for processing of CLI inputs for discovery, in development and test processes, for transformation to still other formats, for creating automated documentation from code, for creating models of command data, for metadata generation, and for creation of models of object data.

Figure 11:
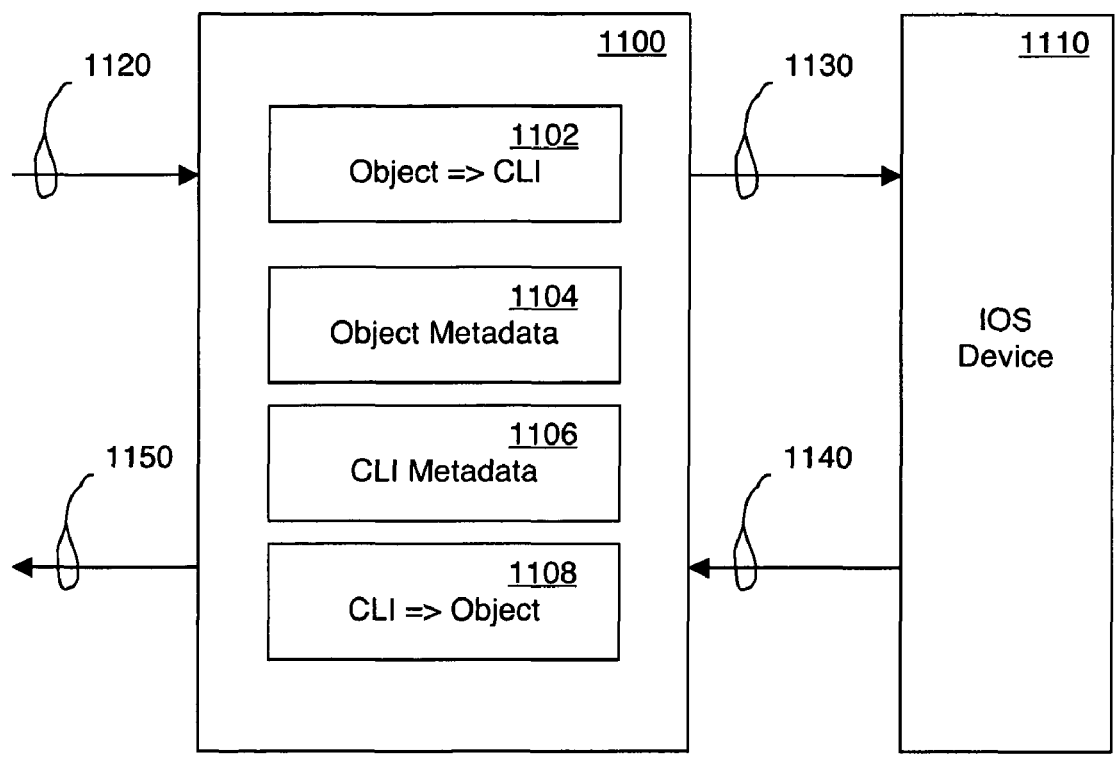
FIG. 11 is a block diagram of an external programmatic interface, in accordance with one embodiment of the present invention.

Referring now to FIG. 11, an external programmatic interface (EPI) is depicted, in accordance with one embodiment of the present invention. In one embodiment, EPI 1100 could exist as a software program running on computer system 112 (FIG. 1). In this embodiment, EPI 1100 consists of four modules: object to CLI translation module 1102, object metadata module 1104, CLI metadata module 1106, and CLI to object translation module 1108. EPI 1100 receives object operation 1120, translates the operation into CLI command 1130, and passes the Command to IOS device 1110. In one embodiment, IOS device 1110 is a router programmed to understand and act on IOS CLI commands. Information that leaves IOS device 1110 is returned to EPI 1100 as CLI information 1140. EPI 1100 translates CLI information 1140 into Object information 1150, and returns Object information 1150 to the user.

Object to CLI translation module 1102, in one embodiment of the invention, translates object operation 1120 into CLI command 1130. The translation process is described in greater detail below, with reference to FIG. 12.

Object metadata module 1104, in one embodiment of the invention, contains a description of the object model used by Object to CLI translation module 1102 in translating object operation 1120 into CLI command 1130. In one embodiment, object metadata module 1104 contains command data model 208, described above.

CLI metadata module 1106, in one embodiment of the invention, contains a description of the structure of the CLI syntax, and is used by CLI to object translation module 1108 in translating CLI information 1140 into Object information 1150. In one embodiment, CLI metadata module 1106 contains parse graph 204, described above. In another embodiment, CLI metadata module 1106 contains AND/OR command tree 206, described above.

CLI to object translation module 1108, in one embodiment of the invention, translates CLI information 1140 into Object information 1150. The translation process is described in greater detail below, with reference to FIG. 13.

Table 18, presented below, describes a number of terms using Extended Backus-Naur-Form (EBNF). These terms are useful for describing the invention in greater depth.

TABLE 18

Figure 12:
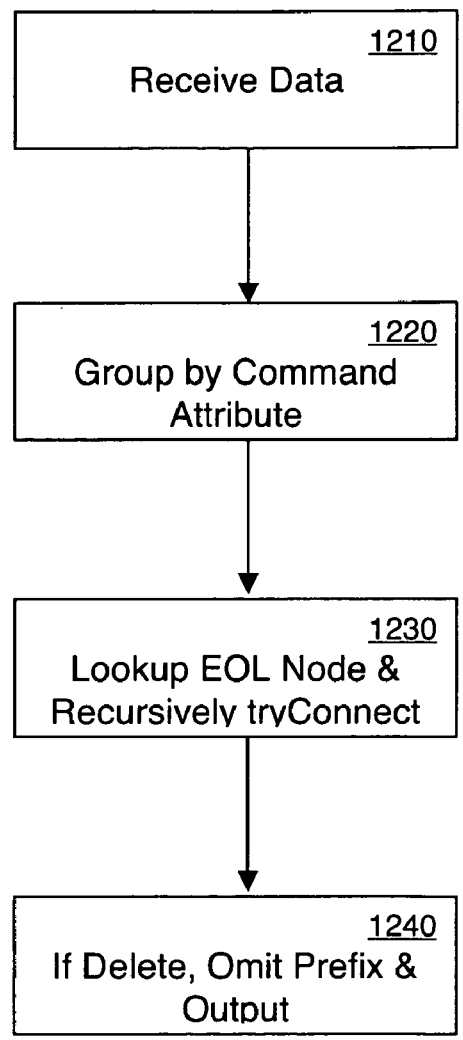
FIG. 12 is a flowchart of a method for translating object operations into CLI commands, in accordance with one embodiment of the invention.

Object Class => set of {nodes associated with CLI keyword }
Command Attribute => one EOL CLI node
Non-boolean Attribute => set of {nodes associated with CLI parameter }
Boolean Attribute => one node associated with CLI keyword
enum => one keyword node for each enum item Referring now to FIG. 12, a flowchart 1200 of a method for translating object operations into CLI commands is depicted, in accordance with one embodiment of the invention. Although specific steps are disclosed in flowchart 1200, such steps are exemplary. That is, embodiments of the present invention are well suited to performing various other (additional) steps or variations of the steps recited in flowchart 1200. It is appreciated that the steps in flowchart 1200 may be performed in an order different than presented, and that not all of the steps in flowchart 1200 may be performed.

In step 1210 of flowchart 1200, in one embodiment, input data is received by EPI 1100, and passed to Object to CLI translation module 1102. In this embodiment, the input data, object operation 1120, originates from a user. A user need not be an actual person; object operation 1120 may originate from an outside program, which would be considered a "user" as well. In this embodiment, object operation 1120 is formatted in accordance with an object model, such as command data model 208. An example of input so formatted appears below, in table 19.

TABLE 19

```
<vrf operation="create">
    <instance_id>vpn14</instance_id>
    <vpn_rd>2.2.2.2:22</vpn_rd>
    <vpnid>33:33</vpnid>
    <route_target>7.7.7.7:77</route_target>
</vrf>
```

In step 1220 of flowchart 1200, in one embodiment, for each object operation 1120, Object to CLI translation module 1102 accesses Object metadata module 1104 to group the request based upon the Command Attribute associated with one CLI command. Object to CLI translation module 1102 then collects the CLI nodes associated with each Command Attribute and its Object Class; this set of nodes is referred to as the Command Node Set.

In step 1230 of flowchart 1200, in one embodiment, for each Command Attribute, Object to CLI translation module 1102 accesses CLI metadata module 1106 to find the EOL node in CLI metadata module 1106. Object to CLI translation module 1102 then recursively applies the rules set forth in table 20, below, as it traverses the data stored in CLI metadata module 1106, starting from the EOL node, trying to connect the nodes in the Command Node Set.

TABLE 20 tryConnect

If the visited CLI node is in the Command Node Set, stop the recursion; connection is found.
If the visited CLI node is the root, stop the recursion; CLI is complete.
Else, for each transition up from the CLI node, recursively call tryConnnect.
   Keep track of the visited nodes.
   If connection is found, translate the visited nodes into CLI:
      Keyword node into keyword.
      parameter node into the value supplied in the request.

In step 1240 of flowchart 1200, in one embodiment, if object operation 1120 was a delete request, the prefix normally applied to a translated CLI command is omitted. After object operation 1120 has passed through Object to CLI translation module 1102, it has been translated CLI command 1130. The example in table 19, above, would be translated into the CLI command appearing in table 21, below.

TABLE 21

```
ip vrf vpn14
rd 2.2.2.2:22
vpn id 33:33
       route-target 7.7.7.7:77
```

Figure 13:
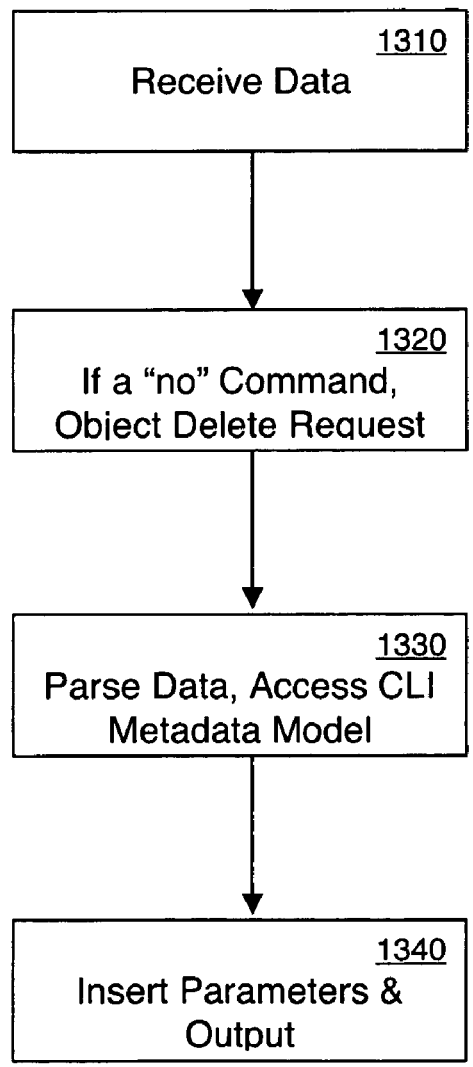
FIG. 13 is a flowchart of a method for translating CLI information into object information, in accordance with one embodiment of the invention.

Referring now to FIG. 13, a flowchart 1300 of a method for translating CLI information into object information is depicted, in accordance with one embodiment of the invention. Although specific steps are disclosed in flowchart 1300, such steps are exemplary. That is, embodiments of the present invention are well suited to performing various other (additional) steps or variations of the steps recited in flowchart 1300. It is appreciated that the steps in flowchart 1300 may be performed in an order different than presented, and that not all of the steps in flowchart 1300 may be performed.

In step 1310 of flowchart 1300, in one embodiment, input data is received by EPI 1100, and passed to CLI to object translation module 1108. In this embodiment, the input data, CLI information 1140, originates from an IOS device 1110, such as a router. CLI information 1140 is formatted in accordance with the rules of the CLI syntax.

In step 1320 of flowchart 1300, in one embodiment, if CLI information 1140 is a "no" command, CLI to object translation module 1108 returns an Object Delete request. A "no" command is a command to delete a configuration or to set configuration to nil.

In step 1330 of flowchart 1300, in one embodiment, CLI information 1140 is parsed. Also in this step, CLI metadata module 1106 is accessed, and the data contained in the CLI metadata structure is traversed. The nodes visited while parsing CLI information 1140 are placed in a list and are matched against the object and attribute definitions in the object model stored in Object metadata module 1104.

In step 1340 of flowchart 1300, in one embodiment, the parameter portion of the prescribed output is filled with the attribute value from CLI information 1140. At the completion of this step, CLI information 1140 has been translated into Object information 1150.

Figure 14:
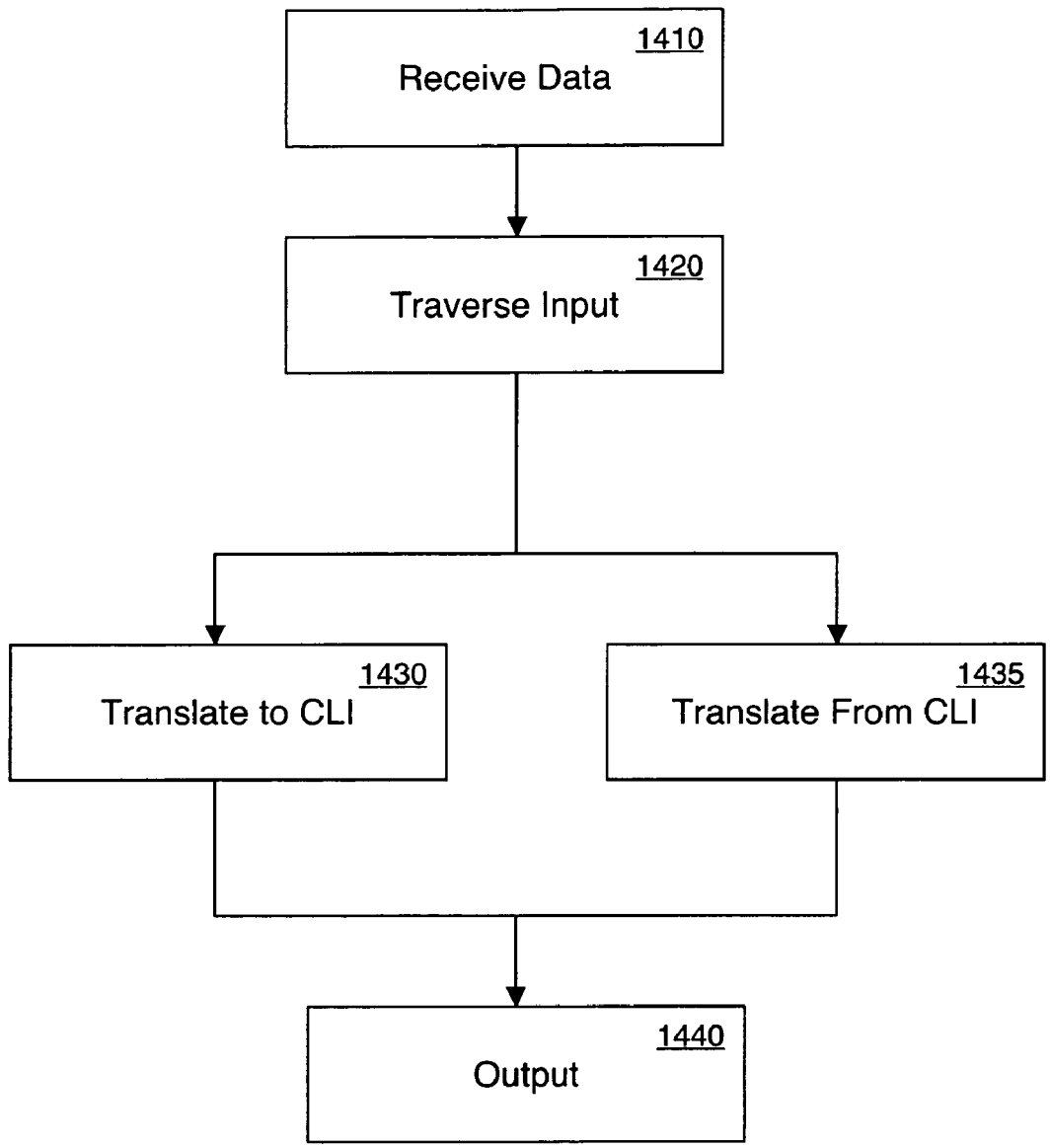
FIG. 14 is a flowchart of a method of receiving and translating data within an external programmatic interface, in accordance with one embodiment of the invention.

With reference now to FIG. 14, a flowchart 1400 of a method of receiving and translating data within an external programmatic interface (EPI) is presented, in accordance with one embodiment of the invention. Although specific steps are disclosed in flowchart 1400, such steps are exemplary. That is, embodiments of the present invention are well suited to performing various other (additional) steps or variations of the steps recited in flowchart 1400. It is appreciated that the steps in flowchart 1400 may be performed in an order different than presented, and that not all of the steps in flowchart 1400 may be performed.

In step 1410 of flowchart 1400, in one embodiment, input data is received at EPI 1100. In one embodiment, this input may originate from a user, and be passed to EPI 1100 as object operation 1120. In another embodiment, the input may originate from IOS Device 1110, and be passed to EPI 1100 as CLI information 1140. This input data can take the form of CLI statements. Alternatively, the input can be formatted in accordance with another language syntax; one embodiment calls for input to be formatted in accordance with a specific XML schema of the CLI syntax.

In step 1420 of flowchart 1400, in one embodiment, the input received in step 1410 is traversed. During traversal, the source of the data can be ascertained (e.g. whether the input originated from a user or from IOS device 1120). This determination affects what operations are performed on the input, as described above with reference to FIGS. 12 and 13.

In step 1430 of flowchart 1400, in one embodiment, when the input received in step 1410 originated from a user, the input is translated into CLI statements. According to one embodiment, the input was originally formatted according to an XML schema of the CLI rules and behaviors. In other embodiments, the input might be received in a different language and translated into CLI. Greater explanation of this transformative behavior is explained above, with reference to FIG. 12.

In step 1435 of flowchart 1400, in one embodiment, when the input received in step 1410 originated from IOS device 1110, the input is translated from CLI statements into a different format. According to one embodiment, the CLI statements would be translated into corresponding XML statements, in accordance with an XML schema of the CLI rules and behaviors. In other embodiments, the input would be translated into other desirable output formats. Greater explanation of this transformative behavior is explained above, with reference to FIG. 13.

In step 1440 of flowchart 1400, in one embodiment, the output of steps 1430 or 1435 is passed along. In the case of step 1430, the transformed input is passed to IOS device 1110 as CLI commands 1130 for further action, now that it is in CLI format. In the case of step 1435, the transformed input leaves EPI 1100 as object information 1150.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
   receiving an input command requesting an operation be performed by a routing system, wherein the input command is configured in an extensible markup language (XML) format having a command line interface (CLI) syntax;
   translating the input command from the XML format having a CLI syntax into a CLI command having a CLI format, wherein translating the input command includes:
      grouping the input command by one or more command attributes associated with at least one CLI command,
      accessing a parse graph of the routing system to identify an end-of-line node for each command attribute associated with the at least one CLI command,
      collecting CLI nodes associated with each command attribute to form a command node set, and
      generating the at least one CLI command by recursively traversing the parse graph, starting with the identified end-of-line node and continuing to a root node, to connect CLI nodes in the command node set, wherein the at least one CLI command is generated based on the connection of the CLI nodes in the command node set; and
   transmitting the CLI command having the CLI format to the routing system for execution of the CLI command.

2. The method of claim 1, further comprising:
   receiving an output message in a CLI format from the routing system responsive to the transmitted CLI command;
   translating the output message from the CLI format into the XML format having the CLI syntax; and
   transmitting the output message in the XML format having the CLI syntax to a remote device external from the routing system.

3. The method of claim 2, wherein the translating of the output message includes:
   parsing the output message to identify one or more nodes in the parse graph, wherein the parse graph includes a set of nodes arranged to represent macroinstructions utilized by the routing system to analyze whether one or more CLI commands input to a CLI prompt have a proper CLI syntax; and
   comparing the one or more nodes identified to object and attribute definitions in the parse graph.

4. The method of claim 2, further comprising:
   determining the output message received from the routing system is a CLI command having a CLI format;
   traversing the parse graph to locate one or more nodes that correspond to the CLI command;
   accessing an XML data model to identify object or attribute definition that corresponds to located nodes; and
   constructing a translated output message from the corresponding objects or attributes.

5. The method of claim 1, wherein the input command comprises XML data formatted in accordance with an XML schema of CLI rules and behaviors.

6. An apparatus storing computer-readable program code that, when executed by a computer system, causes the computer system to:
   receive an input command requesting an operation be performed by a routing system, wherein the input command is configured in an extensible markup language (XML) format having a command line interface (CLI) syntax, wherein the computer system is configured to translate the input command by:
      grouping the input command by one or more command attributes associated with at least one CLI command,
      accessing a parse graph of the routing system to identify an end-of-line node of for each command attribute associated with the at least one CLI command,
      collecting CLI nodes associated with each command attribute to form a command node set, and
      generating the at least one CLI command by recursively traversing the parse graph, starting with the identified end-of-line node, to connect CLI nodes in the command node set up to a root node, wherein the at least one CLI command is generated based on the connection of the CLI nodes in the command node set; and
   translate the input command from the XML format having a CLI syntax into a CLI command having a CLI format; and
   transmit the CLI command having the CLI format to the routing system for execution of the CLI command.

7. The apparatus of claim 6, wherein the computer system is further configured to:
   receive an output message in a CLI format from the routing system responsive to the transmitted CLI command;
   translate the output message from the CLI format into the XML format having the CLI syntax; and
   transmit the output message in the XML format having the CLI syntax to a remote device external from the routing system.

8. The apparatus of claim 7, wherein the computer system is further configured to:
  parse the output message to identify one or more nodes in the parse graph, wherein the parse graph includes a set of nodes arranged to represent macroinstructions utilized by the routing system to analyze whether one or more CLI commands input to a CLI prompt have a proper CLI syntax; and
  compare the one or more nodes identified to object and attribute definitions in the parse graph.

9. The apparatus of claim 7, wherein the computer system is further configured to:
  determine the output message received from the routing system is a CLI command having a CLI format;
  traverse the parse graph to locate one or more nodes that correspond to the CLI command;
  access an XML data model to identify object or attribute definition that corresponds to located nodes; and
  construct a translated output message from the corresponding objects or attributes.

10. The apparatus of claim 6, wherein the input command comprises XML data formatted in accordance with an XML schema of CLI rules and behaviors.

11. A system including a processor and a memory device, the system comprising:
  means for receiving an input command requesting an operation be performed by a routing system, wherein the input command is configured in an extensible markup language (XML) format having a command line interface (CLI) syntax;
  means for translating the input command from the XML format having a CLI syntax into a CLI command having a CLI format, wherein the means for translating the input command is configured to:
    group the input command by one or more command attributes associated with at least one CLI command,
    access a parse graph of the routing system to identify an end-of-line node of for each command attribute associated with the at least one CLI command,
    collect CLI nodes associated with each command attribute to form a command node set, and
    generate the at least one CLI command by recursively traversing the parse graph, starting with the identified end-of-line node and continuing to a root node, to connect CLI nodes in the command node set, wherein the at least one CLI command is generated based on the connection of the CLI nodes in the command node set; and
  means for transmitting the CLI command having the CLI format to the routing system for execution of the CLI command.

12. The system of claim 11, further comprising:
  means for receiving an output message in a CLI format from the routing system responsive to the transmitted CLI command;
  means for translating the output message from the CLI format into the XML format having the CLI syntax; and
  means for transmitting the output message in the XML format having the CLI syntax to a remote device external from the routing system.

13. The system of claim 12, wherein the means for translating of the output message includes:
  means for parsing the output message to identify one or more nodes in the parse graph, wherein the parse graph includes a set of nodes arranged to represent macroinstructions utilized by the routing system to analyze whether one or more CLI commands input to a CLI prompt have a proper CLI syntax; and
  means for comparing the one or more nodes identified to object and attribute definitions in the parse graph.

14. The system of claim 12, further comprising:
  means for determining the output message received from the routing system is a CLI command having a CLI format;
  means for traversing the parse graph to locate one or more nodes that correspond to the CLI command;
  means for accessing an XML data model to identify object or attribute definition that corresponds to located nodes; and
  means for constructing a translated output message from the corresponding objects or attributes.

15. The system of claim 11, wherein the input command comprises XML data formatted in accordance with an XML schema of CLI rules and behaviors.

16. A device comprising:
  an remote interface device to receive an input command requesting an operation be performed by a routing system, wherein the input command is configured in an extensible markup language (XML) format having a command line interface (CLI) syntax;
  a translation module to translate the input command from the XML format having a CLI syntax into a CLI command having a CLI format, wherein translation module is configured to:
    group the input command by one or more command attributes associated with at least one CLI command,
    access a parse graph of the routing system to identify an end-of-line node of for each command attribute associated with the at least one CLI command,
    collect CLI nodes associated with each command attribute to form a command node set, and
    generating the at least one CLI command by recursively traversing the parse graph, starting with the identified end-of-line node and continuing to a root node, to connect CLI nodes in the command node set, wherein the at least one CLI command is generated based on the connection of the CLI nodes in the command node set; and
  a routing system interface device to transmit the CLI command having the CLI format to the routing system for execution of the CLI command.

17. The device of claim 16, wherein the routing system interface is further configured to receive an output message in a CLI format from the routing system responsive to the transmitted CLI command, wherein the translation module is configured to translate the output message from the CLI format into the XML format having the CLI syntax, and wherein the remote device interface is configured to transmit the output message in the XML format having the CLI syntax to a remote device external from the routing system.

18. The device of claim 17, wherein the translation module is further configured to parse the output message to identify one or more nodes in the parse graph, wherein the parse graph includes a set of nodes arranged to represent macroinstructions utilized by the routing system to analyze whether one or more CLI commands input to a CLI prompt have a proper CLI syntax, and to compare the one or more nodes identified to object and attribute definitions in the parse graph.

19. The device of claim 17, wherein the translation module is further configured to:
  determine the output message received from the routing system is a CLI command having a CLI format;

traverse the parse graph to locate one or more nodes that correspond to the CLI command;

access an XML data model to identify object or attribute definition that corresponds to located nodes; and construct a translated output message from the corresponding objects or attributes.

20. The device of claim 16, wherein the input command comprises XML data formatted in accordance with an XML schema of CLI rules and behaviors.

21. The method of claim 1, wherein the parse graph is generated from macroinstructions that are hard-coded into a CLI parser in the routing device, wherein the macroinstructions define a proper CLI syntax for commands input to a CLI prompt and include CLI nodes used by the CLI parser to analyze whether one or more commands input to the CLI prompt have proper CLI syntax.

22. The apparatus of claim 6, wherein the parse graph is generated from macroinstructions that are hard-coded into a CLI parser in the routing device, wherein the macroinstructions define a proper CLI syntax for commands input to a CLI prompt and include CLI nodes used by the CLI parser to analyze whether one or more commands input to the CLI prompt have proper CLI syntax.

23. The system of claim 11, wherein the parse graph is generated from macroinstructions that are hard-coded into a CLI parser in the routing device, wherein the macroinstructions define a proper CLI syntax for commands input to a CLI prompt and include CLI nodes used by the CLI parser to analyze whether one or more commands input to the CLI prompt have proper CLI syntax.

24. The device of claim 16, wherein the parse graph is generated from macroinstructions that are hard-coded into a CLI parser in the routing device, wherein the macroinstructions define a proper CLI syntax for commands input to a CLI prompt and include CLI nodes used by the CLI parser to analyze whether one or more commands input to the CLI prompt have proper CLI syntax.

* * * * *